US010326397B2

(12) United States Patent
Kitamura

(10) Patent No.: US 10,326,397 B2
(45) Date of Patent: *Jun. 18, 2019

(54) MOTOR CONTROL APPARATUS, SHEET CONVEYANCE APPARATUS, DOCUMENT FEEDING APPARATUS, DOCUMENT READING APPARATUS, AND IMAGE FORMING APPARATUS

(71) Applicant: CANON KABUSHIKI KAISHA, Tokyo (JP)

(72) Inventor: Shingo Kitamura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,315

(22) Filed: Oct. 4, 2018

(65) Prior Publication Data

US 2019/0036468 A1     Jan. 31, 2019

Related U.S. Application Data

(63) Continuation of application No. 15/943,022, filed on Apr. 2, 2018, now Pat. No. 10,141,879.

(30) Foreign Application Priority Data

Apr. 24, 2017 (JP) ................................. 2017-085469

(51) Int. Cl.
*H02P 21/22* (2016.01)
*H02P 27/06* (2006.01)
(Continued)

(52) U.S. Cl.
CPC .............. *H02P 21/22* (2016.02); *B65H 5/06* (2013.01); *G03G 15/50* (2013.01);
(Continued)

(58) Field of Classification Search
CPC .......... H02P 21/22; H02P 21/18; H02P 27/06; B65H 5/06; B65H 2403/92; G03G 15/50; G03G 15/6558; G03G 2215/00556
(Continued)

(56) References Cited

U.S. PATENT DOCUMENTS

| 7,725,045 B2* | 5/2010 | Takeyama ............... G03G 15/50 358/1.15 |
| 8,330,965 B2* | 12/2012 | Banton ................... G03G 15/50 347/19 |
| 8,488,186 B2* | 7/2013 | Yazdy ........................ B41J 2/47 358/1.15 |

* cited by examiner

*Primary Examiner* — Neil R McLean

(74) *Attorney, Agent, or Firm* — Canon U.S.A., Inc. IP Division

(57) ABSTRACT

An apparatus, to control a motor from an instructed phase indicating a motor rotor target phase, includes a detector, a phase determiner, a converter, and a controller. The detector detects a motor winding driving current. The phase determiner determines a rotor rotation phase from the detected driving current. The converter converts a detected current value in a stationary coordinate system into a current value in a rotational coordinate system from the determined rotation phase. The controller includes a first mode for controlling the driving current to cause a determined phase deviation between the instructed and rotation phases to decreased, and a second mode for controlling the driving current from a current having a previously determined magnitude. On switching the mode from the second to the first mode, the first mode target value is set from a driving current value corresponding to a current component represented by the rotational coordinate system.

20 Claims, 15 Drawing Sheets

(51) Int. Cl.
*H02P 21/18* (2016.01)
*G03G 15/00* (2006.01)
*B65H 5/06* (2006.01)

(52) U.S. Cl.
CPC ......... *G03G 15/6558* (2013.01); *G03G 15/80* (2013.01); *H02P 21/18* (2016.02); *H02P 27/06* (2013.01); *B65H 2403/92* (2013.01); *G03G 2215/00556* (2013.01); *G03G 2221/1657* (2013.01)

(58) Field of Classification Search
USPC .......................................................... 358/1.15
See application file for complete search history.

MOTOR CONTROL APPARATUS, SHEET CONVEYANCE APPARATUS, DOCUMENT FEEDING APPARATUS, DOCUMENT READING APPARATUS, AND IMAGE FORMING APPARATUS

CROSS REFERENCE TO RELATED APPLICATION

This application is a continuation, and claims the benefit of U.S. patent application Ser. No. 15/943,022, filed Apr. 2, 2018, which claims the benefit of Japanese Patent Application No. 2017-085469, filed Apr. 24, 2017, all of which are hereby incorporated by reference herein in their entirety.

BACKGROUND OF THE INVENTION

Field of the Invention

The present disclosure relates to motor control in a motor control apparatus, a sheet conveyance apparatus, a document feeding apparatus, a document reading apparatus, and an image forming apparatus.

Description of the Related Art

Up to now, a control method called vector control for controlling a motor by controlling a current value in a rotating coordinate system based on a rotation phase of a rotor of the motor has been proposed as a method of controlling the motor. Specifically, a control method of controlling the motor by performing phase feedback control which controls the current value in the rotating coordinate system such that a deviation between an instructed phase of the rotor and the rotation phase of the rotor is decreased has been proposed. A control method of controlling the motor by performing speed feedback control which controls the current value in the rotating coordinate system such that a deviation between an instructed speed of the rotor and a rotation speed of the rotor is decreased has also been proposed.

In the vector control, a driving current flowing through a winding of the motor is represented by a q-axis component (torque current component) corresponding to a current component for generating torque with which the rotor rotates and a d-axis component (excitation current component) corresponding to a current component that affects an intensity of magnetic flux penetrating through the winding of the motor. When a value of the torque current component is controlled in accordance with a change in load torque applied to the rotor, the torque used for the rotation is efficiently generated. As a result, increase in motor sound derived from excess torque and increase in power consumption are suppressed. In addition, it is possible to suppress occurrence of a state in which the rotor becomes out of synchronization with an input signal when the load torque applied to the rotor exceeds output torque corresponding to the driving current provided to the winding of the motor, and the motor is put into an uncontrollable state (step-out state).

In the vector control, a configuration for determining the rotation phase of the rotor is used. According to U.S. Pat. No. 8,970,146, a configuration for determining the rotation phase of the rotor based on an induced voltage generated in the winding in each phase of the motor when the rotor rotates has been described.

A magnitude of the induced voltage generated in the winding is decreased as the rotation speed of the rotor is lower. In a case where the magnitude of the induced voltage generated in the winding is not sufficiently large for determining the rotation phase of the rotor, there is a possibility that the rotation phase is not accurately determined. That is, as the rotation speed of the rotor is lower, there is a possibility that the accuracy for determining the rotation phase of the rotor is degraded.

In view of the above, according to Japanese Patent Laid-Open No. 2005-039955, a configuration has been described in which constant-current control for controlling the motor by providing a previously determined current to the winding of the motor is used in a case where the instructed speed of the rotor is lower than a predetermined rotation speed. It should be noted that neither the phase feedback control nor the speed feedback control is performed in the constant-current control. Furthermore, a configuration has been described in which the vector control is used in a case where the instructed speed of the rotor is higher than or equal to the predetermined rotation speed.

When the motor control is switched from the constant-current control to the vector control, there is a possibility that the rotation speed of the motor is momentarily decreased. This is because there is a possibility that the torque applied to the rotor by the driving current provided in the first place after the motor control is switched is smaller than the torque applied to the rotor by the driving current provided in the last place before the motor control is switched. That is, this is because the torque applied to the rotor immediately before the motor control is switched is different from the torque applied to the rotor immediately after the motor control is switched.

According to Japanese Patent Laid-Open No. 2010-28949, the following configuration has been described. That is, the load torque applied to the rotor is estimated (computed) during micro-step driving on a basis of a signal output from a position detector. Subsequently, a current to be provided immediately after the motor control method is switched from micro-step driving control to speed servo control is determined (computed) based on the estimated load torque. Specifically, according to Japanese Patent Laid-Open No. 2010-28949, a load estimator computes the load torque to determine the current to be provided immediately after the motor control method is switched. Subsequently, a current value corresponding to the load torque is calculated by dividing the load torque by a torque constant, and the calculated current value is multiplied by a control gain to determine the current to be provided.

According to Japanese Patent Laid-Open No. 2010-28949 described above, the processing of dividing the load torque by the previously set torque constant is performed to determine the current to be provided immediately after the motor control method is switched. The torque constant takes different values depending on a temperature of the motor. Therefore, when the torque constant as a fixed value irrespective of the temperature of the motor is used, the calculated current value contains an error. That is, the current to be determined also contains an error, and there is a possibility that the current to be provided immediately after the motor control method is switched is not appropriately set. As a result, there is a possibility that the motor control becomes unstable.

SUMMARY OF THE INVENTION

In view of the above-described issue, the present disclosure aims at suppressing a state in which the motor control becomes unstable when the control mode for controlling the motor is switched.

According to an aspect of the present invention, a motor control apparatus to control a motor based on an instructed phase indicating a target phase of a rotor of the motor includes a detector configured to detect a driving current flowing through a winding of the motor, a phase determiner configured to determine a rotation phase of the rotor based on the driving current detected by the detector, a converter configured to convert a current value in a stationary coordinate system which is detected by the detector into a current value in a rotational coordinate system based on the rotation phase determined by the phase determiner, and a controller including a first control mode for controlling the driving current in a manner that a magnitude of the driving current detected by the detector becomes a target value set in a manner that a phase deviation between the instructed phase and the rotation phase determined by the phase determiner is decreased, and a second control mode for controlling the driving current based on a current having a previously determined magnitude, wherein, in a case where the control mode for controlling the driving current is switched from the second control mode to the first control mode, the target value in the first control mode is set based on a value of a torque current component of the driving current detected by the detector during execution of the second control mode, and wherein the torque current component corresponds to a current component represented by the rotational coordinate system of the driving current converted by the converter.

Further features of the present disclosure will become apparent from the following description of embodiments with reference to the attached drawings.

DESCRIPTION OF THE EMBODIMENTS

Hereinafter, embodiments will be described with reference to the drawings. It should be noted however that shapes of component parts described according to the embodiments, relative arrangements of the component parts, and the like are to be appropriately changed on the basis of configurations of the apparatuses to which the embodiments are applied and various conditions, and the scope is not intended to be limited to the following embodiments. It should be noted that, in the following explanation, a case will be described where a motor control apparatus is installed in an image forming apparatus, but an apparatus where the motor control apparatus is installed is not limited to the image forming apparatus. For example, the motor control apparatus may also be used for a sheet conveyance apparatus that conveys a sheet such as a recording medium or a document.

First Embodiment

Image Forming Apparatus

Figure 1:
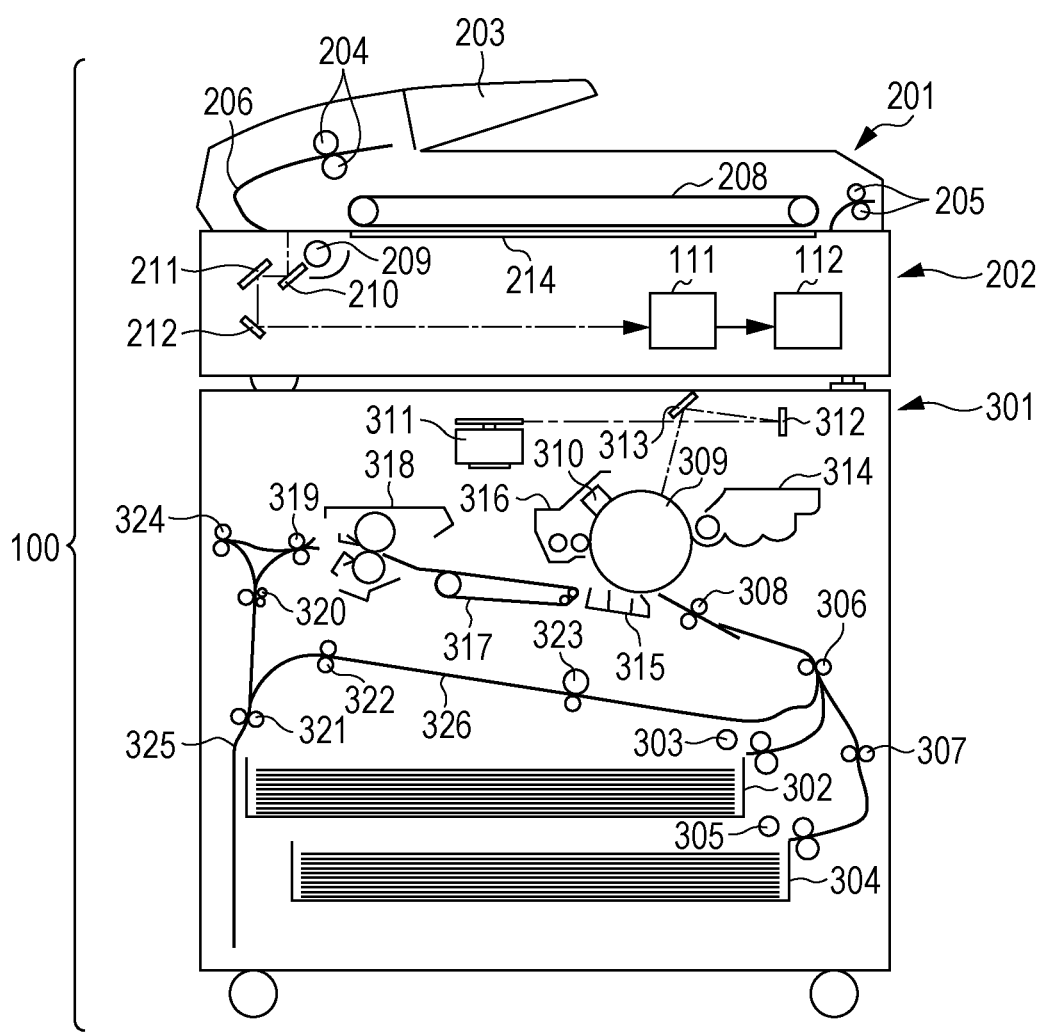
FIG. 1 is a cross sectional diagram for describing an image forming apparatus according to a first embodiment.

FIG. 1 is a cross sectional diagram illustrating a configuration of a copier (hereinafter, which will be referred to as an image forming apparatus) 100 of a monochrome electrophotographic method including a sheet conveyance apparatus according to the present embodiment. It should be noted that the image forming apparatus is not limited to the copier and may also be, for example, a facsimile apparatus, a printing device, a printer, or the like. In addition, the recording method is not limited to the electrophotographic method, and inkjet or the like may be used, for example. Furthermore, a format of the image forming apparatus may be either a monochrome format or a color format.

Hereinafter, a configuration and a function of the image forming apparatus 100 will be described with reference to FIG. 1. As illustrated in FIG. 1, the image forming apparatus 100 includes a document feeding apparatus 201, a reading apparatus 202, and an image printing apparatus 301.

Documents loaded onto a document loading part 203 of the document feeding apparatus 201 are fed one by one by a feeding roller 204 and conveyed onto a document platen 214 of the reading apparatus 202 along a conveyance guide 206. Furthermore, the document is conveyed at a constant speed by a conveyance belt 208 and discharged onto a sheet discharge tray which is not illustrated in the drawing by a discharge roller 205. Reflected light from the document image illuminated by an illumination system 209 at a reading position of the reading apparatus 202 is guided to an image reading unit 111 by an optical system constituted by reflection mirrors 210, 211, and 212 and converted into an image signal by the image reading unit 111. The image reading unit 111 is constituted by a lens, a charge-coupled device (CCD) functioning as a photoelectric conversion element, a driving circuit for the CCD, and the like. The image signal output from the image reading unit 111 is subjected to various correction processings by the image processing unit 112 constituted by a hardware device such as an application specific integrated circuit (ASIC) and then output to the image printing apparatus 301. The reading of the document is performed as described above. That is, the document feeding apparatus 201 and the reading apparatus 202 function as a document reading apparatus.

Reading modes for the document include a first reading mode and a second reading mode. The first reading mode is a reading mode for reading the image of the document conveyed at a constant speed by the illumination system 209 and the optical system which are fixed at predetermined positions. The second reading mode is a reading mode for reading the image of the document placed on the document platen 214 of the reading apparatus 202 by the illumination system 209 and the optical system which move at a constant speed. Normally, an image of a sheet-like document is read in the first reading mode, and an image of a document in bound form such as a book or a brochure is read in the second reading mode.

The image printing apparatus 301 includes sheet storage trays 302 and 304 therein. The sheet storage trays 302 and 304 can respectively store different types of recording media. For example, the sheet storage tray 302 stores plain paper of A4 size, and the sheet storage tray 304 stores thick paper of A4 size. It should be noted that the recording media refer to materials on which an image is formed by the image forming apparatus, and sheets, resin sheets, cloths, overhead projector (OHP) sheets, labels, and the like are included in the recording media, for example.

The recording medium stored in the sheet storage tray 302 is fed by a feeding roller 303 and conveyed to a registration roller 308 by a conveyance roller 306. The recording medium stored in the sheet storage tray 304 is fed by a feeding roller 305 and conveyed to the registration roller 308 by conveyance rollers 307 and 306.

The image signal output from the reading apparatus 202 is input to an optical scanning apparatus 311 including a semiconductor laser and a polygon mirror. An outer circumferential surface of a photosensitive drum 309 is charged by a charger 310. After the outer circumferential surface of the photosensitive drum 309 is charged, laser light in accordance with the image signal input from the reading apparatus 202 to the optical scanning apparatus 311 passes through a polygon mirror and mirrors 312 and 313 from the optical scanning apparatus 311, and the outer circumferential surface of the photosensitive drum 309 is irradiated with the laser light. As a result, an electrostatic latent image is formed on the outer circumferential surface of the photosensitive drum 309. It should be noted that a charging method using a corona charger and a charging roller is used for the charging of the photosensitive drum 309, for example.

Subsequently, the electrostatic latent image is developed by toner in a developing unit 314, and a toner image is formed on the outer circumferential surface of the photosensitive drum 309. The toner image formed on the photosensitive drum 309 is transferred to the recording medium by a transfer charger 315 provided in a position (transfer position) facing the photosensitive drum 309. The registration roller 308 conveys the recording medium to the transfer position in synchronism with this transfer timing.

As described above, the recording medium onto which the toner image is transferred is conveyed to a fixing unit 318 by a conveyance belt 317 and subjected to application of heat pressure by the fixing unit 318, so that the toner image is fixed onto the recording medium. In this manner, the image is formed on the recording medium by the image forming apparatus 100.

In a case where the image formation is performed in a one-side printing mode, the recording medium that has passed through the fixing unit 318 is discharged to the sheet discharge tray which is not illustrated in the drawing by sheet discharge rollers 319 and 324. On the other hand, in a case where the image formation is performed in a duplex printing mode, after the fixing unit 318 performs fixing processing on a first surface of the recording medium, the recording medium is conveyed to a reversing path 325 by the sheet discharge roller 319, a conveyance roller 320, and a reversing roller 321. Thereafter, the recording medium is conveyed to the registration roller 308 again by conveyance rollers 322 and 323, and an image is formed on a second surface of the recording medium by the above-described method. Thereafter, the recording medium is discharged to the sheet discharge tray which is not illustrated in the drawing by the sheet discharge rollers 319 and 324.

In a case where the recording medium where the image is formed on the first surface is discharged face-down to the outside of the image forming apparatus 100, the recording medium that has passed through the fixing unit 318 passes through the sheet discharge roller 319 and is conveyed in a direction towards the conveyance roller 320. Thereafter, when the rotation of the conveyance roller 320 is reversed immediately before a rear end of the recording medium passes a nip portion of the conveyance roller 320, the recording medium passes through the sheet discharge roller 324 in a state in which the first surface of the recording medium faces down and is discharged to the outside of the image forming apparatus 100.

The configuration and functions of the image forming apparatus 100 have been described in the above. It should be noted that loads in the embodiments refer to targets driven by a motor. For example, various rollers (conveyance rollers) such as the feeding rollers 204, 303, and 305, the registration roller 308, and the sheet discharge roller 319, the photosensitive drum 309, the conveyance belts 208 and 317, the illumination system 209, the optical system, and the like correspond to the loads in the embodiments. A motor control apparatus according to the present embodiment can be applied to the motor that drives these loads.

Figure 2:
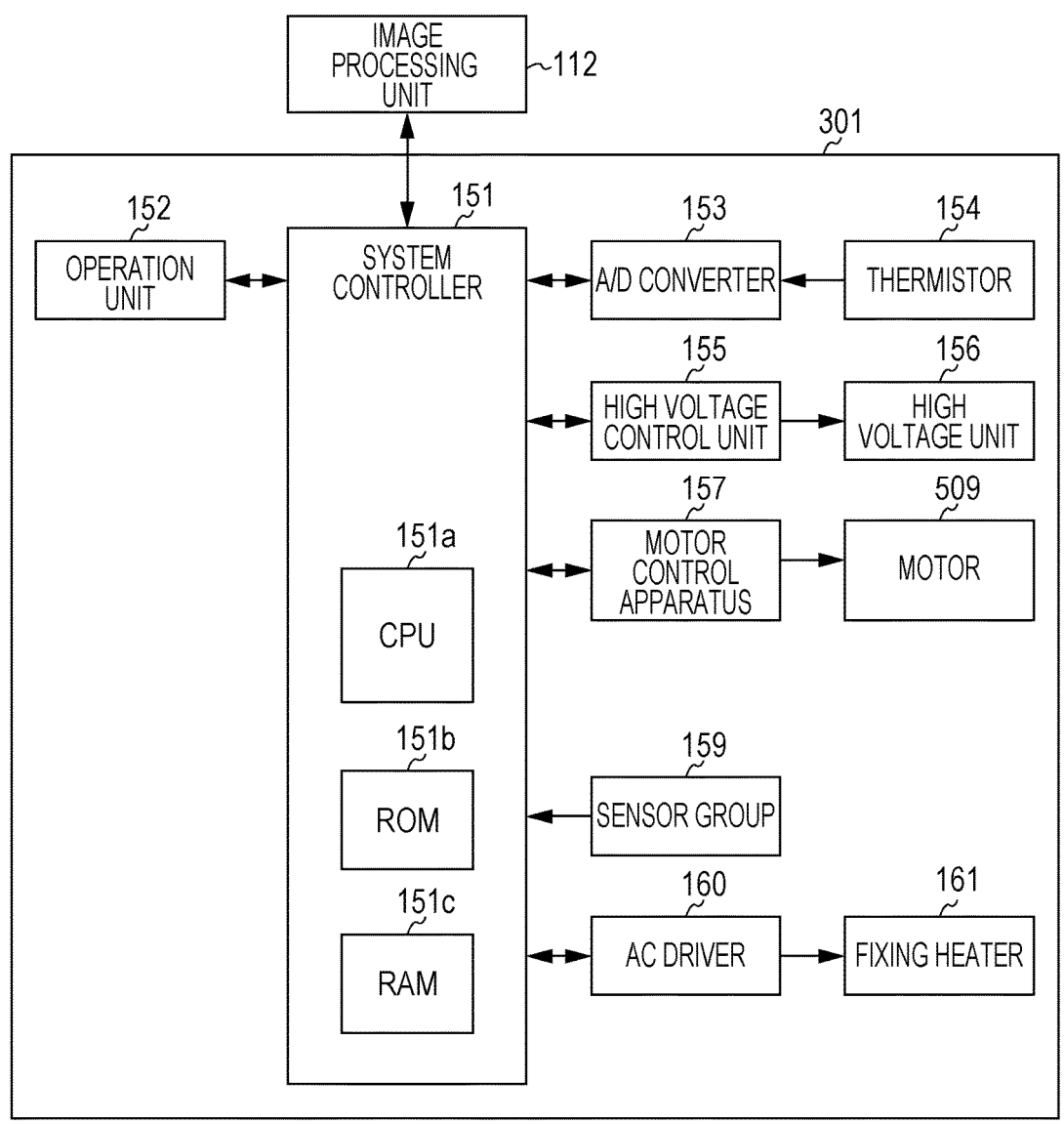
FIG. 2 is a block diagram illustrating a control configuration of the image forming apparatus.

FIG. 2 is a block diagram illustrating an example of a control configuration of the image forming apparatus 100. As illustrated in FIG. 2, a system controller 151 is provided with a CPU 151a, a ROM 151b, and a RAM 151c. In addition, the system controller 151 is connected to the image processing unit 112, an operation unit 152, an analog-to-digital (A/D) converter 153, a high voltage control unit 155, a motor control apparatus 157, a sensor group 159, and the AC driver 160. The system controller 151 can transmit and receive data and commands between the corrected respective units.

The CPU 151a reads out and executes various programs stored in the ROM 151b to execute various sequences related to previously determined image forming sequences.

The RAM 151c is a storage device. The RAM 151c stores various data including a setting value with respect to the high voltage control unit 155, an instructed value with respect to the motor control apparatus 157, and information received from the operation unit 152, for example.

The system controller 151 transmits setting value data of various apparatuses included in the image forming apparatus 100 which is used for the image processing in the image processing unit 112 to the image processing unit 112. Furthermore, the system controller 151 receives a signal from the sensor group 159 and sets the setting value of the high voltage control unit 155 on the basis of the received signal.

The high voltage control unit 155 provides a voltage used in a high voltage unit 156 (including the charger 310, the developing unit 314, the transfer charger 315, and the like) in accordance with the setting value set by the system controller 151. It should be noted that the sensor group 159 includes a sensor configured to detect the recording medium conveyed by the conveyance roller and the like.

The motor control apparatus 157 controls the motor 509 that drives the load in accordance with an instruction output from the CPU 151a. It should be noted that only the motor 509 is illustrated as the motor of the image forming apparatus in FIG. 2, but a plurality of motors are included in the image forming apparatus in actuality. In addition, a configuration may be adopted in which a single motor control apparatus controls a plurality of motors. Furthermore, although only the single motor control apparatus is illustrated in FIG. 2, a plurality of motor control apparatuses are included in the image forming apparatus in actuality.

The A/D converter 153 receives a detection signal detected by a thermistor 154 configured to detect a temperature of a fixing heater 161 and converts the detection signal from an analog signal to a digital signal to be transmitted to the system controller 151. The system controller 151 performs control of an AC driver 160 on the basis of the digital signal received from the A/D converter 153. The AC driver 160 controls the fixing heater 161 such that the temperature of the fixing heater 161 becomes a temperature at which fixing processing is performed. It should be noted that the fixing heater 161 is a heater used in the fixing processing and is included in the fixing unit 318.

The system controller 151 controls the operation unit 152 such that an operation screen for a user to perform a setting of a type of the recording medium to be used (hereinafter, which will be referred to as sheet type) or the like is displayed on a display unit included in the operation unit 152. The system controller 151 receives the information set by the user from the operation unit 152 and controls an operation sequence of the image forming apparatus 100 on the basis of the information set by the user. The system controller 151 also transmits information indicating a state of the image forming apparatus to the operation unit 152. It should be noted that the information indicating the state of the image forming apparatus is, for example, information related to the number of images to be formed, a progress status of the image forming operation, jamming or double feeding of the sheet material in the document feeding apparatus 201 and the image printing apparatus 301, and the like. The operation unit 152 displays the information received from the system controller 151 on the display unit.

The system controller 151 controls the operation sequence of the image forming apparatus 100 as described above.

Motor Control Apparatus

Next, a motor control apparatus according to the present embodiment will be described. The motor control apparatus according to the present embodiment can control the motor by performing either the vector control as a first control mode or the constant-current control as a second control mode.

Vector Control

First, a method for the motor control apparatus 157 to perform the vector control according to the present embodiment will be described with reference to FIG. 3 and FIG. 4. It should be noted that the motor in the following explanation is not provided with a sensor such as a rotary encoder configured to detect a rotation phase of a rotor of the motor.

Figure 3:
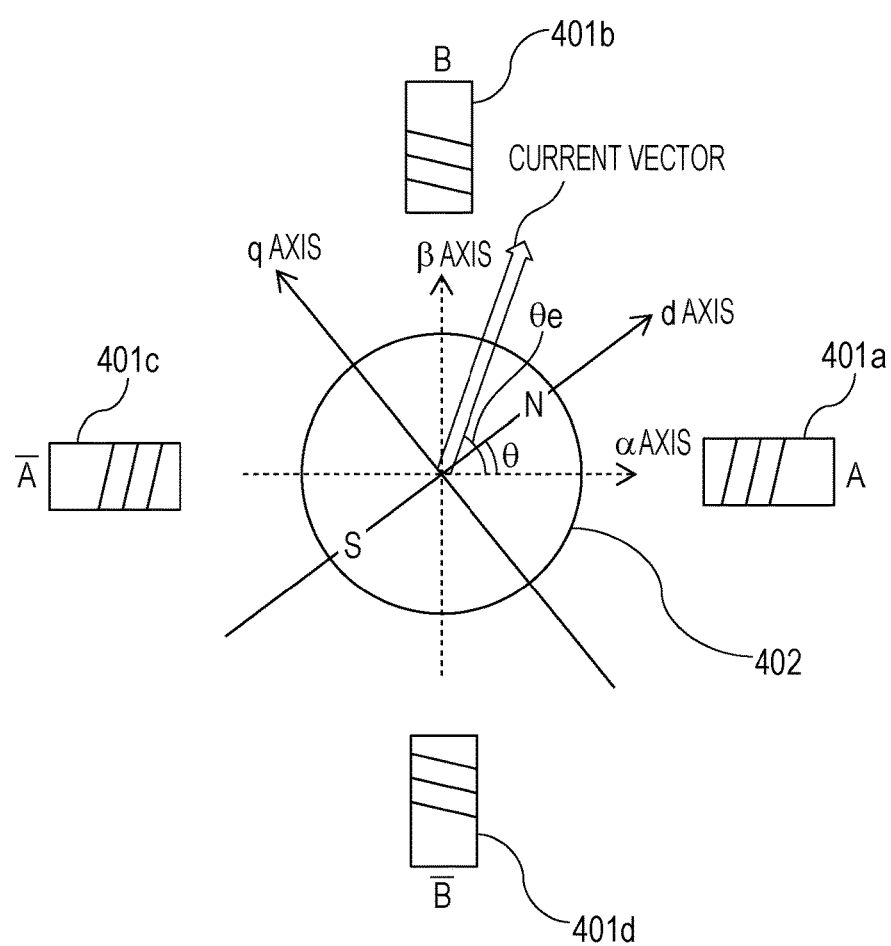
FIG. 3 illustrates a relationship between a two-phase motor constituted by an A phase and a B phase and a rotating coordinate system represented by a d axis and a q axis.

FIG. 3 illustrates a relationship between the stepping motor (hereinafter, which will be referred to as motor) 509 constituted by two phases including an A phase (first phase) and a B phase (second phase) and a rotating coordinate system represented by a d axis and a q axis. In FIG. 3, an α axis that is an axis corresponding to an A-phase winding and a β axis that is an axis corresponding to a B-phase winding are defined in stationary coordinate system. In addition, in FIG. 3, the d axis is defined along a direction of magnetic flux formed by magnetic poles of permanent magnet used as a rotor 402, and the q axis is defined along a direction advanced by 90 degrees in an anticlockwise direction from the d axis (direction orthogonal to the d axis). An angle formed by the α axis and the d axis is defined as θ, and a rotation phase of the rotor 402 is represented by the angle θ. The rotating coordinate system based on the rotation phase θ of the rotor 402 is used in the vector control. Specifically, a q-axis component (torque current component) for generating torque in the rotor and a d-axis component (excitation current component) that affects an intensity of magnetic flux penetrating through the winding which are current components in the rotating coordinate system of a current vector corresponding to the driving current flowing through the winding are used in the vector control.

The vector control is a control method of controlling the motor by performing the phase feedback control for controlling the value of the torque current component and the value of the excitation current component in a manner that a deviation between an instructed phase indicating a target phase of the rotor and an actual rotation phase is decreased. In addition, a method of controlling the motor by performing the speed feedback control for controlling the value of the torque current component and the value of the excitation current component in a manner that a deviation between an instructed speed indicating a target speed of the rotor and an actual rotation speed is decreased has been proposed.

Figure 4:
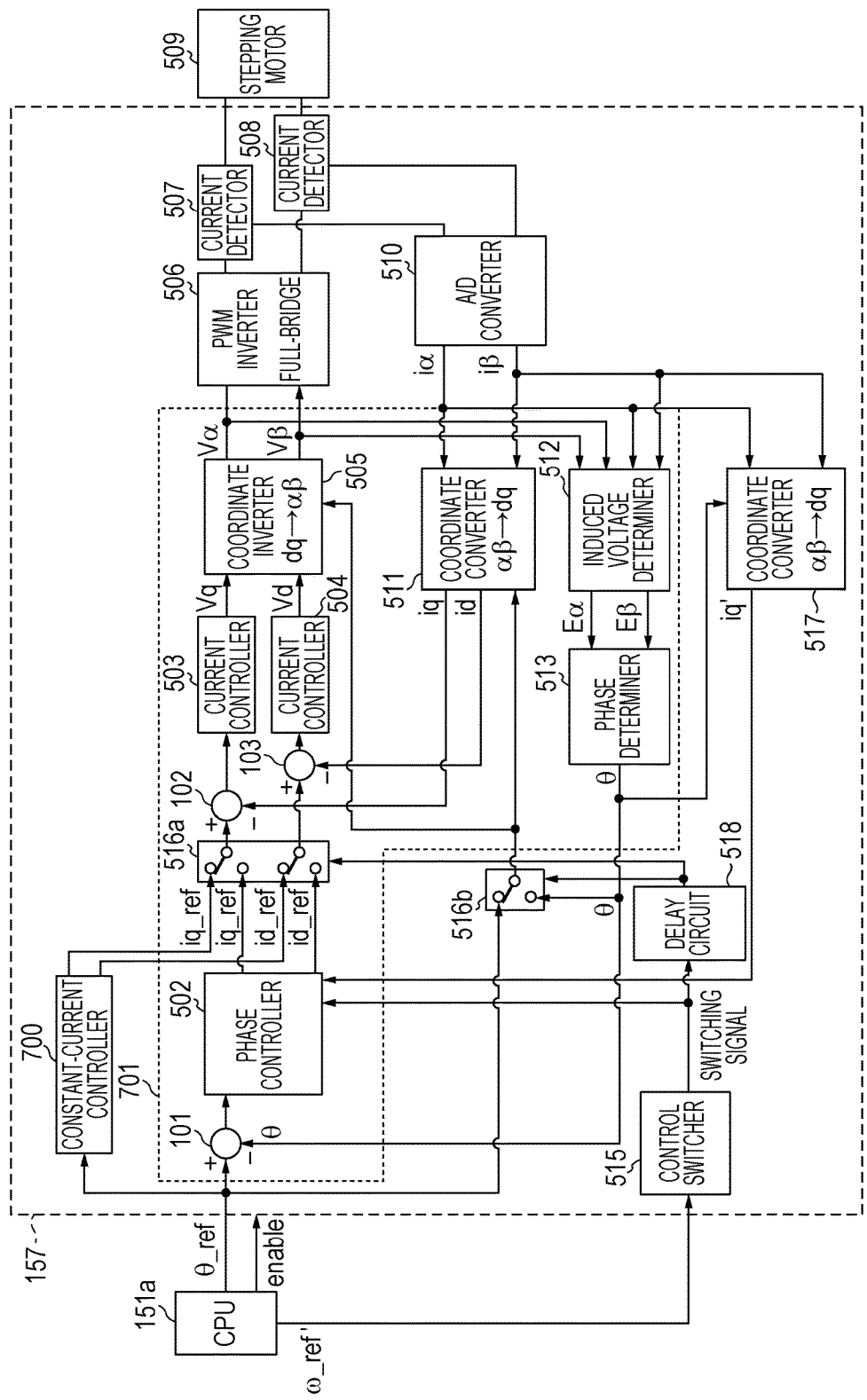
FIG. 4 is a block diagram illustrating a configuration of a motor control apparatus according to the first embodiment.

FIG. 4 is a block diagram illustrating an example of a configuration of the motor control apparatus 157 that controls the motor 509. It should be noted that the motor control apparatus 157 is constituted by at least one ASIC and executes respective functions which will be described below.

As illustrated in FIG. 4, the motor control apparatus 157 includes a constant-current controller 700 that performs constant-current control and a vector controller 701 that performs vector control.

The motor control apparatus 157 includes a phase controller 502, current controllers 503 and 504, a coordinate inverter 505, a coordinate converter 511, a pulse-width modulation (PWM) inverter 506 that provides a driving current to the winding of the motor, and the like as a circuit that performs the vector control. The coordinate converter 511 performs coordinate conversion of the current vector corresponding to the driving currents flowing through the windings in the A phase and the B phase of the motor 509 from the stationary coordinate system represented by the α axis and the β axis to the rotating coordinate system represented by the q axis and the d axis. As a result, the driving currents flowing through the windings are represented by the current value of the q-axis component (q-axis current) and the current value of the d-axis component (d-axis current) which are the current values in the rotating coordinate system. It should be noted that the q-axis current is equivalent to the torque current for generating the torque in the rotor 402 of the motor 509. The d-axis current is equivalent to the excitation current that affects the intensity of the magnetic flux penetrating through the winding of the motor 509. The motor control apparatus 157 can independently control the q-axis current and the d-axis current. As a result, when the motor control apparatus 157 controls the q-axis current based on the load torque applied to the rotor 402, it is possible to efficiently generate the torque for the rotor 402 to rotate. That is, a magnitude of the current vector illustrated in FIG. 3 changes in accordance with the load torque applied to the rotor 402 in the vector control.

The motor control apparatus 157 determines the rotation phase θ of the rotor 402 of the motor 509 by a method which will be described below and performs the vector control based on the determination result. The CPU 151a generates an instructed phase θ_ref indicating a target phase of the rotor 402 of the motor 509 and outputs the instructed phase θ_ref to the motor control apparatus 157. It should be noted that the CPU 151a outputs a pulse signal to the motor control apparatus 157 in actuality. The number of pulses corresponds to the instructed phase, and a frequency of the pulse corresponds to the target speed. The instructed phase θ_ref is generated, for example, based on a target speed of the motor 509.

A subtractor 101 computes and outputs a deviation between the rotation phase θ of the rotor 402 of the motor 509 and the instructed phase θ_ref.

Figure 5:
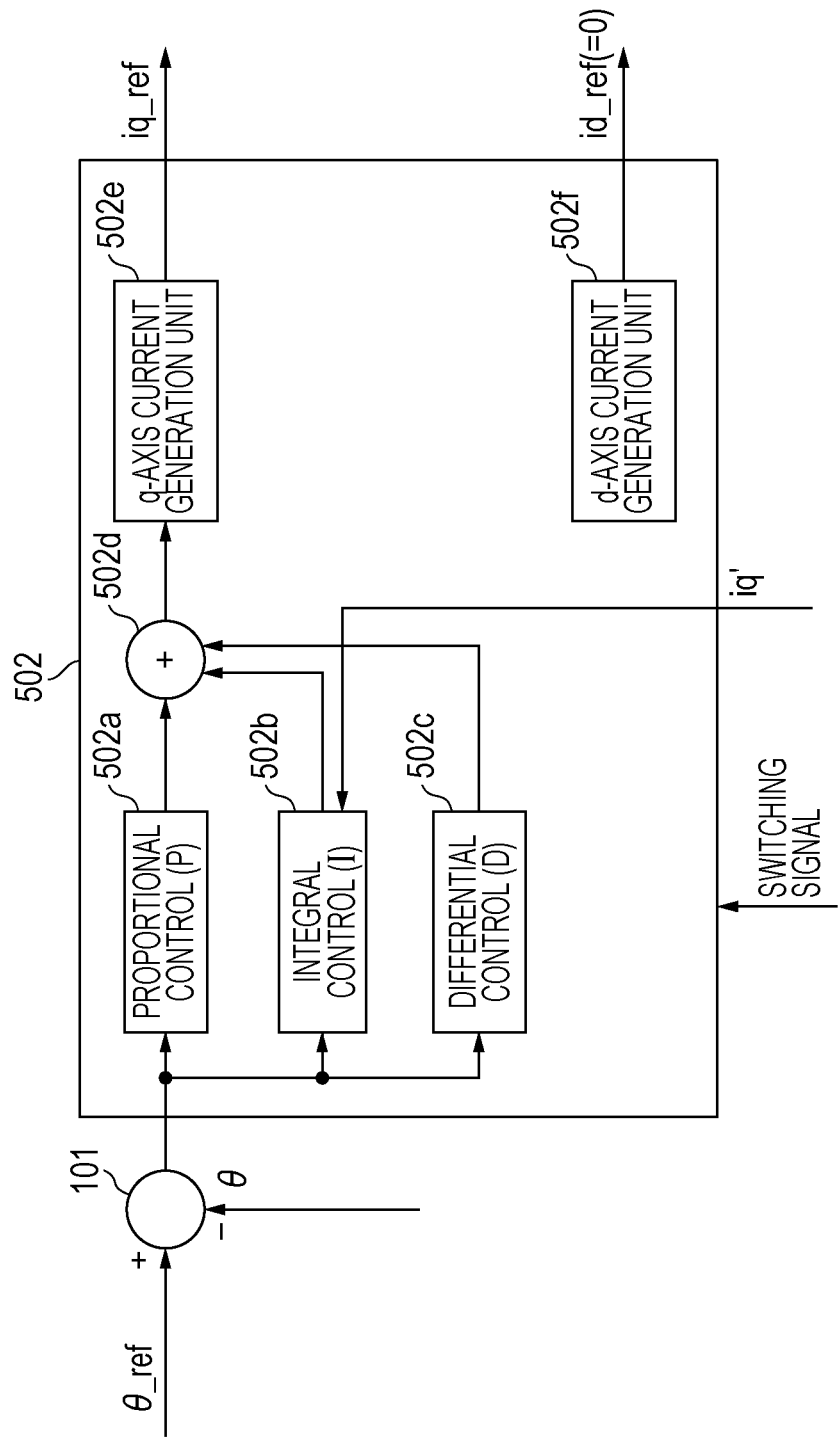
FIG. 5 is a block diagram illustrating a configuration of a phase controller according to the first embodiment.

FIG. 5 is a block diagram illustrating a configuration of the phase controller 502. It should be noted that the configuration of the phase controller 502 illustrated in FIG. 5 is an example according to the present embodiment, and the configuration of the phase controller 502 is not intended to be limited to this.

As illustrated in FIG. 5, the phase controller 502 includes a proportional control unit 502a that performs proportional control (P), an integral control unit 502b that performs integral control (I), and a differential control unit 502c that performs differential control (D). The phase controller 502 also includes an adder 502d that adds signals output from the proportional control unit 502a, the integral control unit 502b, and the differential control unit 502c to one another. Furthermore, the phase controller 502 includes a q-axis current generation unit 502e that generates a q-axis current instructed value (target value) iq_ref on the basis of the signal output from the adder 502d and a d-axis current generation unit 502f that generates a d-axis current instructed value (target value) id_ref.

The phase controller 502 generates the q-axis current instructed value iq_ref such that the deviation output from the subtractor 101 is decreased on the basis of the proportional control (P), the integral control (I), and the differential control (D) and outputs the q-axis current instructed value iq_ref. Specifically, the phase controller 502 generates the q-axis current instructed value iq_ref such that the deviation output from the subtractor 101 becomes 0 on the basis of the P control, the I control, and the D control and outputs the q-axis current instructed value iq_ref.

More specifically, the proportional control unit 502a outputs a value in proportion to the deviation such that the deviation output from the subtractor 101 becomes 0. The integral control unit 502b also outputs a value in proportion to a temporal integration of the deviation such that the deviation output from the subtractor 101 becomes 0. In addition, the differential control unit 502c outputs a value in proportion to a temporal change of the deviation such that the deviation output from the subtractor 101 becomes 0. It should be noted that a current value iq' input to the integral control unit 502b will be described below.

Subsequently, the adder 502d adds the values output from the proportional control unit 502a, the integral control unit 502b, and the differential control unit 502c to one another, and the added value is output to the q-axis current generation unit 502e. The q-axis current generation unit 502e generates the q-axis current instructed value iq_ref based on the value output from the adder 502d and outputs the q-axis current instructed value iq_ref. Specifically, for example, the q-axis current generation unit 502e generates the q-axis current instructed value iq_ref by multiplying the value output from the adder 502d by a previously set proportionality coefficient and outputs the q-axis current instructed value iq_ref.

The d-axis current generation unit 502f sets the d-axis current instructed value id_ref as 0 and outputs the set value. It should be noted that, according to the present embodiment, the d-axis current generation unit 502f sets the d-axis current instructed value id_ref that affects the intensity of the magnetic flux penetrating through the winding as 0, but the configuration is not limited to this. For example, the d-axis current generation unit 502f may set the d-axis current instructed value id_ref as a value other than 0 on the basis of the instruction from the CPU 151a and output the set value.

It should be noted that the phase controller 502 according to the present embodiment generates the q-axis current instructed value iq_ref based on the PID control, but the configuration is not limited to this. For example, the phase controller 502 may generate the q-axis current instructed value iq_ref based on the PI control.

The driving currents flowing through the windings in the A phase and the B phase of the motor 509 are detected by current detectors 507 and 508 and thereafter converted from analog values to digital values by an A/D converter 510. It should be noted that cycles for the current detectors 507 and 508 to detect the currents are, for example, cycles shorter than a cycle T in which the phase controller 502 obtains the deviation output from the subtractor 101 (for example, 25 μs).

The current values of the driving currents converted from the analog values to the digital values by the A/D converter 510 are represented by the following expressions as current values iα and iβ in the stationary coordinate system using a phase θe of the current vector illustrated in FIG. 3. It should be noted that the phase θe of the current vector is defined as an angle formed by the α axis and the current vector. I denotes a magnitude of the current vector.

$$i\alpha = I^* \cos \theta e \quad (1)$$

$$i\beta = I^* \sin \theta e \quad (2)$$

The current values iα and iβ are input to the coordinate converters 511 and 517 and an induced voltage determiner 512.

The coordinate converter 511 converts the current values iα and iβ in the stationary coordinate system into a current value iq of the q-axis current and a current value id of the d-axis current in the rotating coordinate system by the following expressions.

$$id = \cos \theta^* i\alpha + \sin \theta^* i\beta \quad (3)$$

$$iq = -\sin \theta^* i\alpha + \cos \theta^* i\beta \quad (4)$$

In the vector control, the q-axis current instructed value iq_ref output from the phase controller 502 is input to a subtractor 102 via the switch 516a. In addition, the current value iq output from the coordinate converter 511 is input to the subtractor 102. The subtractor 102 computes a deviation between the q-axis current instructed value iq_ref and the current value iq and outputs the deviation to the current controller 503.

In the vector control, the d-axis current instructed value id_ref output from the phase controller 502 is input to a subtractor 103 via the switch 516a. In addition, the current value id output from the coordinate converter 511 is input to the subtractor 103. The subtractor 103 computes a deviation between the d-axis current instructed value id_ref and the current value id and outputs the deviation to the current controller 504. It should be noted that the switch 516a will be described below.

Figure 6:
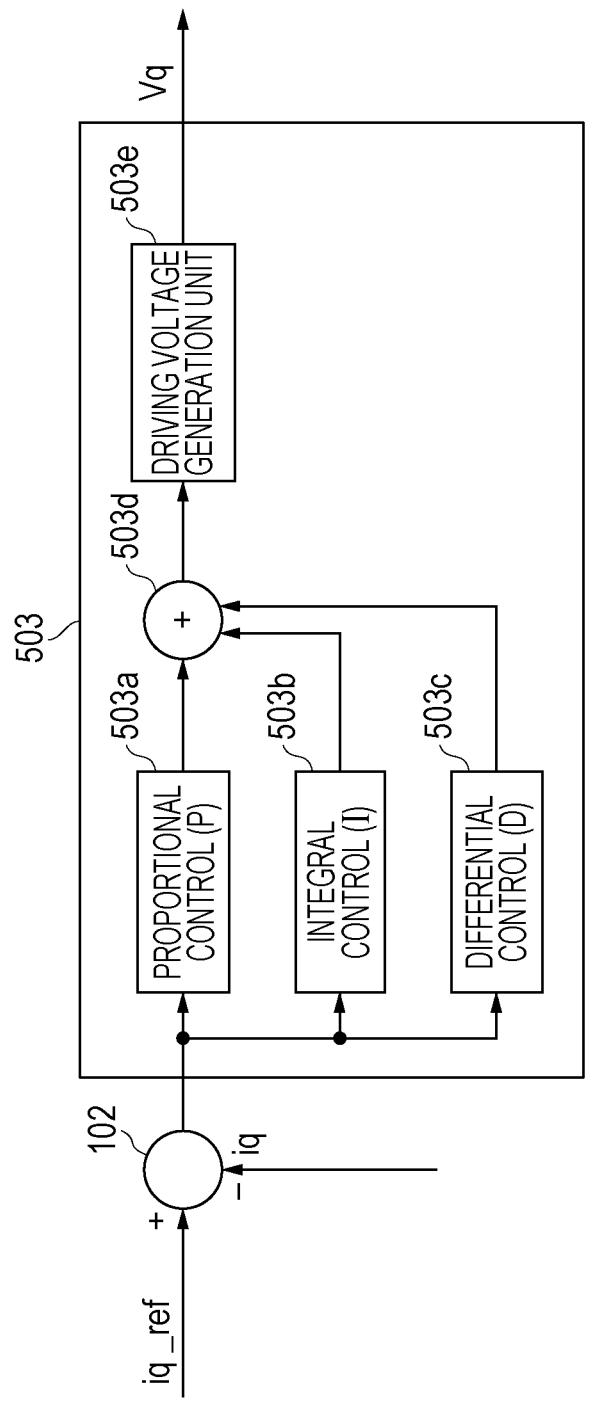
FIG. 6 is a block diagram illustrating a configuration of a current controller according to the first embodiment.

FIG. 6 is a block diagram illustrating a configuration of the current controller 503. It should be noted that the configuration of the current controller 503 illustrated in FIG. 6 is an example according to the present embodiment, and the configuration of the current controller 503 is not intended to be limited to this.

As illustrated in FIG. 6, the current controller 503 includes a proportional control unit 503a that performs the P control, an integral control unit 503b that performs the I control, and a differential control unit 503c that performs the D control. The current controller 503 also includes an adder 503d that adds the signals output from the proportional control unit 502a, the integral control unit 502b, and the differential control unit 502c to one another. Furthermore, the current controller 503 includes a driving voltage generation unit 503e that generates a driving voltage Vq as a value of the q-axis component of the voltage vector corresponding to the driving voltage to be applied to the winding of the motor 509 based on the signal output from the adder 503d.

The current controller 503 generates the driving voltage Vq such that the deviation output from the subtractor 102 is decreased based on the PID control. Specifically, the current controller 503 generates the driving voltage Vq such that the deviation output from the subtractor 102 becomes 0 and outputs the driving voltage Vq to the coordinate inverter 505.

More specifically, the proportional control unit 503a outputs the value in proportion to the deviation such that the deviation output from the subtractor 102 becomes 0. The integral control unit 503b outputs the value in proportion to the temporal integration of the deviation such that the deviation output from the subtractor 102 becomes 0. The differential control unit 503c outputs the value in proportion to the temporal change of the deviation such that the deviation output from the subtractor 102 becomes 0.

Subsequently, the adder 503d adds the values output from the proportional control unit 503a, the integral control unit 503b, and the differential control unit 503c to one another, and the added value is output to the driving voltage generation unit 503e. The driving voltage generation unit 503e generates the driving voltage Vq based on the value output from the adder 503d and outputs the driving voltage Vq. Specifically, for example, the driving voltage generation unit 503e generates the driving voltage Vq by multiplying the value output from the adder 503d by a previously set proportionality coefficient and outputs the driving voltage Vq.

In this manner, the current controller 503 functions as the generation unit that generates the driving voltage. It should be noted that the current controller 504 has a configuration similar to the current controller 503 and generates the driving voltage Vd as the value of the d-axis component of the voltage vector corresponding to the driving voltage to be applied to the winding of the motor 509 by a method similar to that of the current controller 503.

It should be noted that the current controllers 503 and 504 according to the present embodiment generate the driving voltages Vq and Vd on the basis of the PID control, but the configuration is not limited to this. For example, the current controller 503 may generate the driving voltages Vq and Vd on the basis of the PI control.

The coordinate inverter 505 performs inverse conversion of the driving voltages Vq and Vd in the rotating coordinate system which are output from the current controllers 503 and 504 into the driving voltages Vα and Vβ in the stationary coordinate system by the following expressions.

$$V\alpha = \cos\theta * Vd - \sin\theta * Vq \quad (5)$$

$$V\beta = \sin\theta * Vd + \cos\theta * Vq \quad (6)$$

The coordinate inverter 505 outputs the driving voltages Vα and Vβ after the inverse conversion to the induced voltage determiner 512 and the PWM inverter 506.

The PWM inverter 506 includes a full-bridge circuit. The full-bridge circuit is driven by a PWM signal based on the driving voltages Vα and Vβ input from the coordinate inverter 505. As a result, the PWM inverter 506 generates driving currents iα and iβ in accordance with the driving voltages Vα and Vβ and provides the driving currents iα and iβ to the windings in the respective phases of the motor 509 to drive the motor 509. That is, the PWM inverter 506 functions as a provider configured to provide currents to the windings in the respective phases of the motor 509. It should be noted that the PWM inverter includes the full-bridge circuit according to the present embodiment, but the PWM inverter may also be a half-bridge circuit or the like.

Next, a configuration for determining the rotation phase θ will be described. Values of induced voltages Eα and Eβ induced in the windings in the A phase and the B phase of the motor 509 by the rotation of the rotor 402 are used to determine the rotation phase θ of the rotor 402. The values of the induced voltages are determined (calculated) by the induced voltage determiner 512. Specifically, the induced voltages Eα and Eβ are determined by the following expressions based on the current values iα and iβ input from the A/D converter 510 to the induced voltage determiner 512 and the driving voltages Vα and Vβ input from the coordinate inverter 505 to the induced voltage determiner 512.

$$E\alpha = V\alpha - R*i\alpha - L*di\alpha/dt \quad (7)$$

$$E\beta = V\beta - R*i\beta - L*di\beta/dt \quad (8)$$

Where R denotes a winding resistance and L denotes a winding inductance. Values of the winding resistance R and the winding inductance L are unique values to the used motor 509 and are previously stored in the ROM 151b, a memory (not illustrated) included in the motor control apparatus 157, or the like.

The induced voltages Eα and Eβ determined by the induced voltage determiner 512 are output to a phase determiner 513.

The phase determiner 513 determines the rotation phase θ of the rotor 402 of the motor 509 by the following expression based on a ratio of the induced voltage Eα and the induced voltage Eβ output from the induced voltage determiner 512.

$$\theta = \tan^{-1}(-E\beta/E\alpha) \quad (9)$$

It should be noted that, according to the present embodiment, the phase determiner 513 determines the rotation phase θ by performing the computation based on Expression (9), but the configuration is not limited to this. For example, the phase determiner 513 may also determine the rotation phase θ by referring to a table indicating a relationship between the induced voltage Eα and the induced voltage Eβ and the rotation phase θ corresponding to the induced voltage Eα and the induced voltage Eβ which is stored in the ROM 151b or the like.

The rotation phase θ of the rotor 402 obtained as described above is input to the subtractor 101, the switch 516b, and the coordinate converter 517. In a case where the vector control is performed, the rotation phase θ is input to the coordinate inverter 505 and the coordinate converter 511 via the switch 516b. It should be noted that the switch 516b and the coordinate converter 517 will be described below.

In a case where the vector control is performed, the motor control apparatus 157 repeatedly performs the above-described control.

As described above, the motor control apparatus 157 according to the present embodiment performs the vector control using the phase feedback control for controlling the current value in the rotating coordinate system such that the deviation between the instructed phase θ_ref and the rotation phase θ is decreased. When the vector control is performed, it is possible to suppress the motor putting into the step-out state or the increase in the motor sound and the increase in the power consumption derived from the excess torque. When the phase feedback control is performed, it is possible to control the rotation phase of the rotor such that the rotation phase of the rotor becomes a desired phase. Therefore, when the vector control based on the phase feedback control is applied to the motor that drives the load (such as the registration roller) where the rotation phase of the rotor is to be accurately controlled in the image forming apparatus, it is possible to appropriately perform the image formation onto the recording medium.

Constant-Current Control

Next, constant-current control according to the present embodiment will be described while being compared with constant-current control in related art.

In the constant-current control, the driving current flowing through the winding is controlled by providing the current, which is previously determined based on the operation sequence of the motor, to the winding of the motor. In the constant-current control, a driving current having an amplitude corresponding to torque obtained by adding a predetermined margin to the torque supposed to be used for the rotation of the rotor is provided in a manner that the motor is not put into the step-out state even when the load torque applied to the rotor fluctuates. This is because the driving current is not adjustable in accordance with the load torque applied to the rotor since the configuration in which the amplitude of the driving current is controlled on the basis of the determined (estimated) rotation phase of the rotor or the rotation speed is not used (feedback control is not performed) in the constant-current control. It should be noted that as the torque applied to the rotor is increased as the amplitude of the current is larger. In addition, the amplitude corresponds to the magnitude of the current vector.

In the following explanation, the motor is controlled by providing the current having the constant amplitude to the winding of the motor during the constant-current control, but the configuration is not limited to this. For example, the motor may be controlled by providing a current having a previously determined amplitude to the winding of the motor in accordance with respective times of acceleration and deceleration of the motor during the constant-current control.

Figure 7:
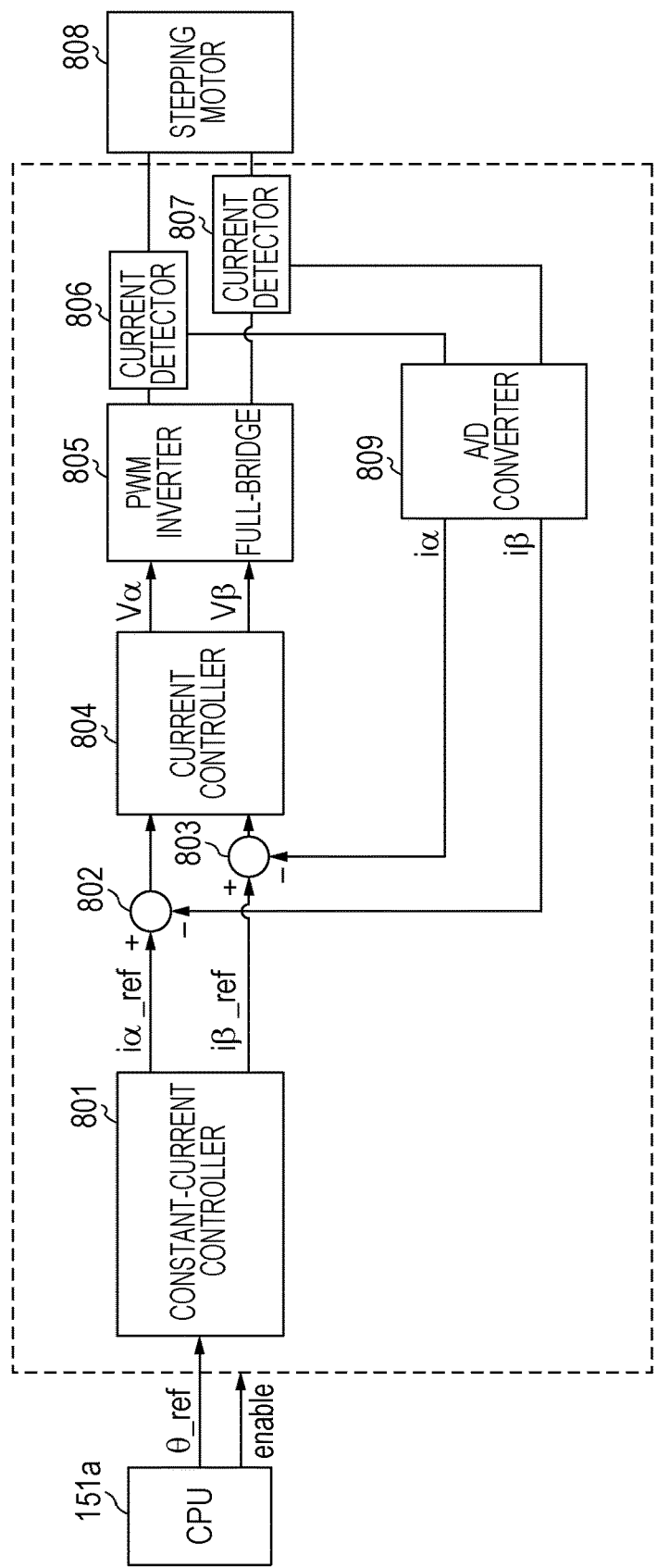
FIG. 7 is a block diagram illustrating an example of a control configuration of constant-current control in related art.

FIG. 7 is a block diagram illustrating an example of a control configuration of the constant-current control in related art. First, the constant-current control in the relate art will be described.

The CPU 151a outputs the instructed phase θ_ref to a constant-current controller 801. The constant-current controller 801 generates current instructed values iα_ref and iβ_ref in the stationary coordinate system corresponding to the instructed phase θ_ref output from the CPU 151a and outputs the current instructed values iα_ref and iβ_ref. It should be noted that, according to the present embodiment, the magnitude of the current vector corresponding to the current instructed values iα_ref and iβ_ref in the stationary coordinate system is regularly constant.

The driving currents flowing through the windings in the A phase and the B phase of the motor 509 are detected by current detectors 806 and 807. The detected driving currents are converted from analog values into digital values by an A/D converter 809 and represented as the current values iα and iβ as represented by Expressions (1) and (2).

The current value iα output from the A/D converter 809 and the current instructed value iα_ref output from the constant-current controller 801 are input to a subtractor 802. The subtractor 102 computes a deviation between the current instructed value iα_ref and the current value iα and outputs the deviation to a current controller 804.

The current value iβ output from the A/D converter 809 and the current instructed value iβ_ref output from the constant-current controller 801 are input to a subtractor 803. The subtractor 803 computes a deviation between the current instructed value iβ_ref and the current value iβ and outputs the deviation to the current controller 804.

The current controller 804 outputs the driving voltages Vα and Vβ such that the input deviation is decreased based on the PID control. Specifically, the current controller 804 outputs the driving voltages Vα and Vβ such that the input deviation is set to be close to 0.

The PWM inverter 506 provides the driving currents to the windings in the respective phases of the motor 509 to drive the motor 509 based on the input driving voltages Vα and Vβ by the above-described method.

In this manner, the current values iα and iβ in the stationary coordinate system are used in the constant-current control in the related art.

Next, the constant-current control according to the present embodiment will be described.

Figure 8:
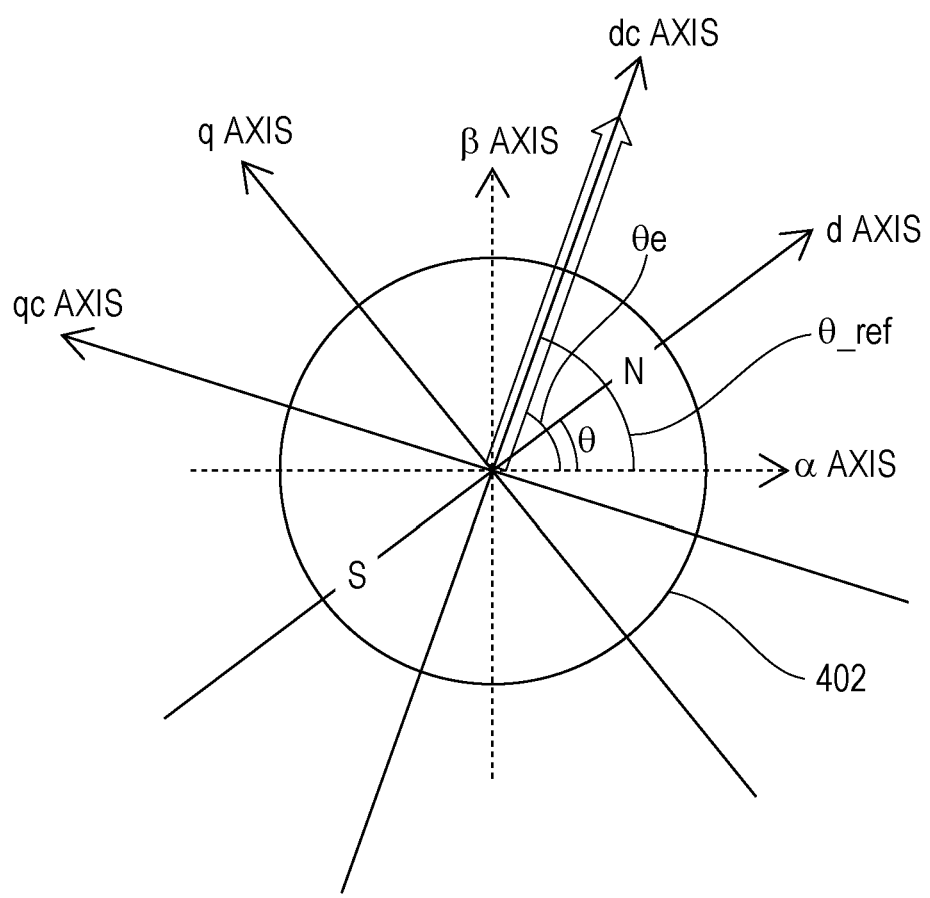
FIG. 8 is an explanatory diagram for describing constant-current control according to the first embodiment.

FIG. 8 is an explanatory diagram for describing the constant-current control according to the present embodiment. A dc axis illustrated in FIG. 8 indicates a direction advanced by the instructed phase θ_ref in the anticlockwise direction from the α axis, and a qc axis indicates a direction advanced by 90 degrees in the anticlockwise direction from the dc axis (direction orthogonal to the dc axis). In the constant-current control according to the present embodiment, the rotating coordinate system, based on the instructed phase θ_ref, represented by the dc axis and the qc axis is used. Specifically, as illustrated in FIG. 8, the phase θe of the current vector corresponding to the driving current provided to the winding is set as θ_ref in the constant-current control according to the present embodiment. That is, the driving current provided to the winding is generated such that the direction of the current vector corresponding to the driving current provided to the winding is matched with the dc axis. It should be noted that the configuration of the winding of the motor or the like as illustrated in FIG. 3 is omitted in FIG. 8.

Figure 9:
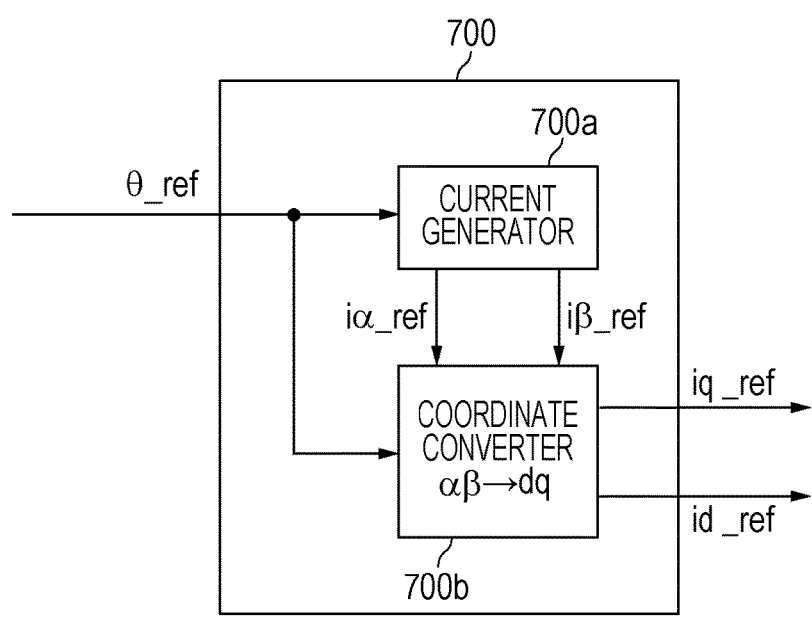
FIG. 9 is a block diagram illustrating an example of a configuration of a constant-current controller according to the first embodiment.

FIG. 9 is a block diagram illustrating an example of the configuration of the constant-current controller 700 illustrated in FIG. 4. As illustrated in FIG. 9, the constant-current controller 700 includes a current generator 700a and a coordinate converter 700b.

Hereinafter, a method for the motor control apparatus 157 to perform the constant-current control according to the present embodiment will be described with reference to FIG. 4, FIG. 8, and FIG. 9.

The CPU 151a outputs the instructed phase θ_ref to the current generator 700a and the coordinate converter 700b included in the constant-current controller 700. The current generator 700a generates the current instructed values iα_ref and iβ_ref in the stationary coordinate system corresponding to the instructed phase θ_ref output from the CPU 151a and outputs the current instructed values iα_ref and iβ_ref to the coordinate converter 700b.

The coordinate converter 700b converts the current instructed values iα_ref and iβ_ref in the stationary coordinate system into the q-axis current instructed value iq_ref and the d-axis current instructed value id_ref in the rotating coordinate system by Expressions (3) and (4) and outputs the q-axis current instructed value iq_ref and the d-axis current instructed value id_ref. It should be noted that, according to the present embodiment, the magnitude of the current vector corresponding to the current instructed values iα_ref and iβ_ref (magnitude of the current vector corresponding to the q-axis current instructed value iq_ref and the d-axis current instructed value id_ref) is regularly constant.

The driving currents flowing through the windings in the A phase and the B phase of the motor 509 are detected by the current detectors 507 and 508. The detected driving currents are converted from the analog values into the digital values by the A/D converter 510 and represented as the current values iα and iβ as represented by Expressions (1) and (2).

In the constant-current control, the instructed phase θ_ref is input to the coordinate converter 511 via a switch 516b. The coordinate converter 511 converts the current values iα and iβ in the stationary coordinate system which are output from the A/D converter 510 into the current value iq of the q-axis current and the current value id of the d-axis current in the rotating coordinate system based on the instructed phase θ_ref by Expressions (3) and (4).

In the constant-current control, the q-axis current instructed value iq_ref output from the constant-current controller 700 is input to the subtractor 102 via the switch 516a. In addition, the current value iq output from the coordinate converter 511 is input to the subtractor 102. The subtractor 102 computes a deviation between the q-axis current instructed value iq_ref and the current value iq and outputs the deviation to the current controller 503.

The d-axis current instructed value id_ref output from in the constant-current control, the constant-current controller 700 is input to the subtractor 103 via the switch 516a. In addition, the current value id output from the coordinate converter 511 is input to the subtractor 103. The subtractor 103 computes a deviation between the d-axis current instructed value id_ref and the current value id and outputs the deviation to the current controller 504. It should be noted that the switch 516a will be described below.

The current controllers 503 and 504 output the driving voltages Vq and Vd in the rotating coordinate system based on the instructed phase θ_ref such that the input deviation is decreased. Specifically, the current controllers 503 and 504 output the driving voltages Vq and Vd such that the input deviation is set to be close to 0.

In the constant-current control, the instructed phase θ_ref is input to the coordinate inverter 505 via the switch 516b. The coordinate inverter 505 performs inverse conversion of the driving voltages Vq and Vd in the rotating coordinate system based on the instructed phase θ_ref into the driving voltages Vα and Vβ in the stationary coordinate system by Expressions (5) and (6).

The coordinate inverter 505 outputs the driving voltages Vα and Vβ after the inverse conversion to the PWM inverter 506. The PWM inverter 506 provides the driving currents to the windings in the respective phases of the motor 509 to drive the motor 509 by the above-described method.

In this manner, in the constant-current control according to the present embodiment, the rotating coordinate system, represented by the dc axis and the qc axis, based on the instructed phase θ_ref is used.

In the constant-current control according to the present embodiment, neither the phase feedback control nor the speed feedback control is performed. That is, in the constant-current control according to the present embodiment, the driving current provided to the winding is not adjusted in accordance with the rotation state of the rotor. Therefore, in the constant-current control, a current obtained by adding a predetermined margin to the current used for rotating the rotor is provided to the winding such that the motor is not put into the step-out state. Specifically, the current instructed values iα_ref and iβ_ref in the stationary coordinate system include the current values used for rotating the rotor and the current values corresponding to predetermined margins.

Switching of the Vector Control and the Constant-Current Control

Next, a method of switching the vector control and the constant-current control will be described. As illustrated in FIG. 4, the motor control apparatus 157 according to the present embodiment includes a configuration for switching the constant-current control and the vector control. Specifically, the motor control apparatus 157 includes a control switcher 515, switches 516a and 516b, and a delay circuit 518. It should be noted that the circuit that performs the vector control also operates during a period in which the constant-current control is performed. That is, the circuit that determines the rotation phase of the rotor θ operates during the period in which the constant-current control is performed. On the other hand, during the period in which the vector control is performed, the circuit that performs the constant-current control may also operate or may stop.

As illustrated in FIG. 4, a rotation speed ω_ref' as a substitute of the instructed speed of the rotor determined by the CPU 151a on the basis of the instructed phase θ_ref is input to the control switcher 515. The control switcher 515 compares the rotation speed ω_ref' with a threshold ωth to perform the switching of the constant-current control and the vector control and further outputs a switching signal indicating switching of the control. It should be noted that the CPU 151a determines the rotation speed ω_ref' on the basis of a change amount of the instructed phase θ_ref in a predetermined period. That is, the rotation speed ω_ref' changes at a predetermined time cycle.

Figure 10:
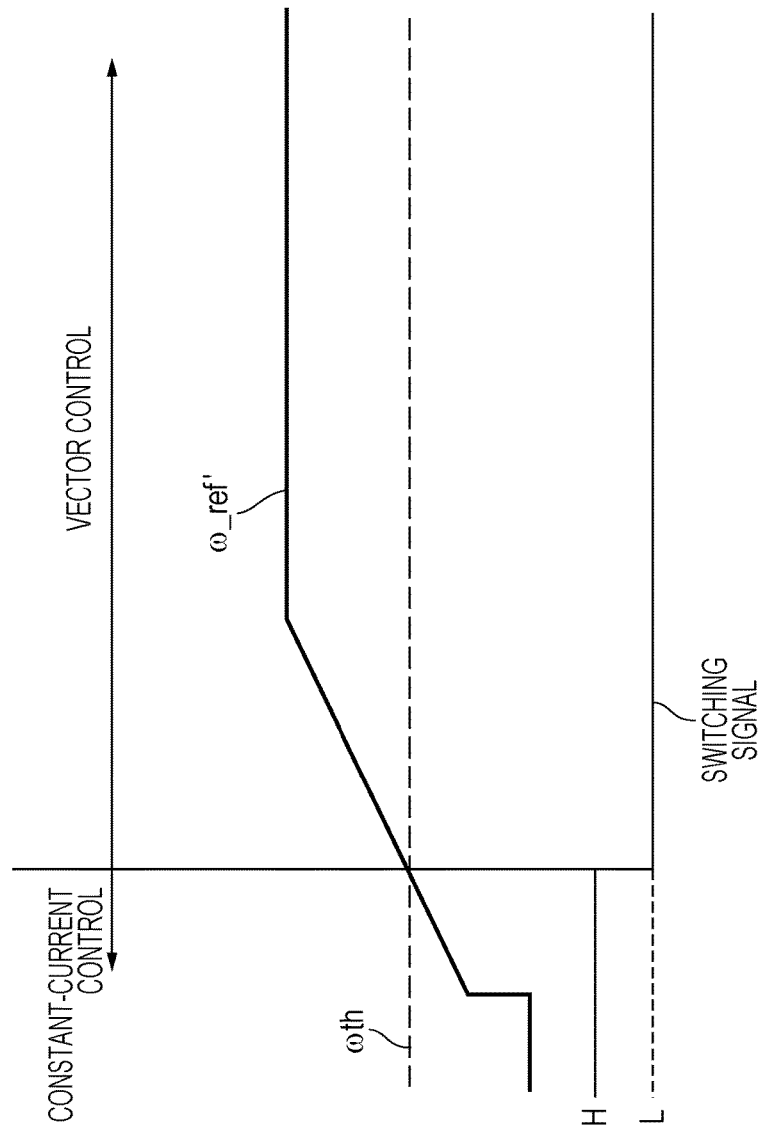
FIG. 10 illustrates a relationship between a rotation speed and a threshold and a switching signal.

FIG. 10 illustrates a relationship between the rotation speed ω_ref' and the threshold ωth and the switching signal. The threshold ωth according to the present embodiment is set as the lowest rotation speed among the rotation speeds at which the rotation phase θ is accurately determined, but the configuration is not limited to this. For example, the threshold ωth may be set as a value higher than or equal to the lowest rotation speed among the rotation speeds at which the rotation phase θ is accurately determined.

As illustrated in FIG. 10, the control switcher 515 sets the switching signal as 'H' in a case where the constant-current control is performed and sets the switching signal as 'L' in a case where the vector control is performed. As illustrated in FIG. 4, the switching signal output from the control switcher 515 is input to the phase controller 502 and the delay circuit 518. It should be noted that the control switcher 515 outputs the switching signal at the same cycle as the cycle at which the CPU 151a outputs the rotation speed ω_ref, for example.

The delay circuit 518 outputs the input switching signal after a predetermined delayed time since the switching signal is output from the control switcher 515. It should be noted that the predetermined delayed time is longer than the time to be used for the phase controller 502 to output iq_ref and id_ref in accordance with the switching signal since the switching signal is output from the control switcher 515. A configuration in which the phase controller 502 outputs iq_ref and id_ref in accordance with the switching signal will be described below.

During the control by the constant-current controller 700, when the rotation speed ω_ref becomes higher than or equal to the threshold ωth (ω_ref≥ωth), the control switcher 515 switches the controller that controls the motor 509. That is, the control switcher 515 switches the switching signal from 'H' to 'L' such that the controller that controls the motor 509 is switched from the constant-current controller 700 to the vector controller 701 and outputs the switching signal. After the elapse of the predetermined delayed time since the switching signal is output from the control switcher 515, the delay circuit 518 outputs the input switching signal to the switches 516a and 516b. As a result, the states of the switches 516a and 516b are switched in accordance with the switching signal, and the vector control by the vector controller 701 is performed. It should be noted that the threshold ωth is previously stored in the ROM 151b, for example.

On the other hand, during the control by the constant-current controller 700, in a case where the rotation speed ω_ref is lower than the threshold ωth (ω_ref<ωth), the control switcher 515 does not switch the controller that controls the motor 509. That is, the control switcher 515 outputs the switching signal 'H' such that the state in which the motor 509 is controlled by the constant-current controller 700 is maintained. After the elapse of the predetermined delayed time since the switching signal is output from the control switcher 515, the delay circuit 518 outputs the input switching signal to the switches 516a and 516b. As a result, the states of the switches 516a and 516b are maintained, and the constant-current control by the constant-current controller 700 is continued.

When the rotation speed ω_ref becomes lower than the threshold ωth (ω_ref<ωth) during the control by the vector controller 701, the control switcher 515 switches the controller that controls the motor 509. That is, the control switcher 515 switches the switching signal from 'L' to 'H' such that the controller that controls the motor 509 is switched from the vector controller 701 to the constant-current controller 700 and outputs the switching signal. After the elapse of the predetermined delayed time since the switching signal is output from the control switcher 515, the delay circuit 518 outputs the input switching signal to the switches 516a and 516b. As a result, the states of the switches 516a and 516b are switched, and the constant-current control by the constant-current controller 700 is performed.

On the other hand, in a case where the rotation speed ω_ref is higher than or equal to the threshold ωth (ω_ref≥ωth) during the control by the vector controller 701, the control switcher 515 does not switch the controller that controls the motor 509. That is, the control switcher 515 outputs the switching signal 'L' such that the state in which the motor 509 is controlled by the vector controller 701 is maintained. After the elapse of the predetermined delayed time since the switching signal is output from the control switcher 515, the delay circuit 518 outputs the input switching signal to the switches 516a and 516b. As a result, the states of the switches 516a and 516b are maintained, and the vector control by the vector controller 701 is continued.

Processing at the Time of the Control Switching

Next, descriptions will be provided of processing performed by the motor control apparatus 157 when the motor control method is switched from the constant-current control to the vector control.

As described above, when the motor control is switched from the constant-current control to the vector control, there is a possibility that the rotation speed of the motor is momentarily decreased (or increased). This is because the difference between the torque generated in the rotor immediately before the motor control is switched and the torque generated in the rotor immediately after the motor control is switched occurs.

In view of the above, according to the present embodiment, when the following configuration is applied to the motor control apparatus 157, the occurrence of the state in which the motor control becomes unstable is suppressed.

As illustrated in FIG. 4, the coordinate converter 517 is included in the motor control apparatus 157 according to the present embodiment. It should be noted that, in the following explanation, the coordinate converter 517 operates during the period in which the constant-current control is performed. In addition, the coordinate converter 517 may operate or may also stop during the period in which the vector control is performed. In the following explanation, the phase controller 502 operates during the period in which the constant-current control is performed.

As illustrated in FIG. 4, the current values iα and iβ output from the A/D converter 510 and the rotation phase θ output from the phase determiner 513 are input to the coordinate converter 517. The coordinate converter 517 converts the current values iα and iβ into the current value iq' and id' in the rotating coordinate system based on the rotation phase θ by using Expressions (3) and (4). The current value iq' converted by the coordinate converter 517 is input to the phase controller 502. Specifically, as illustrated in FIG. 5, the current value iq' is input to the integral control unit 502b provided inside the phase controller 502. It should be noted that the coordinate converter 517 outputs iq' at the same cycle as the cycle at which the current detectors 507 and 508 detects the currents.

When the switching signal is switched from 'H' to 'L', the integral control unit 502b outputs the control result of the integral control unit 502b on the basis of the current value iq' obtained immediately before the switching signal is switched. Specifically, when the switching signal is switched from 'H' to 'L', the integral control unit 502b sets a value obtained by multiplying the current value iq' obtained immediately before the switching signal is switched by a proportionality coefficient Kq as an integration initial value of the integral control unit 502b. That is, when the switching signal is switched from 'H' to 'L', the integral control unit 502b deletes the integration results up to a point immediately before the switching signal is switched and sets the value obtained by multiplying the current value iq' obtained immediately before the switching signal is switched by the proportionality coefficient Kq as the integration initial value. It should be noted that the proportionality coefficient Kq is a coefficient set in a manner that the value corresponding to the margin added to the current, such that the motor is not put into the step-out state in the constant-current control, is not included in the current value iq'. Therefore, when the current value iq' is multiplied by the proportionality coefficient Kq, the integral control unit 502b can perform the integral control based on the value that does not include the value corresponding to the above-described margin. As a result, the torque applied to the rotor immediately after the motor control is switched from the constant-current control to the vector control becomes more appropriate torque as compared with the case where the current value iq' that is not multiplied by the proportionality coefficient Kq is set as the initial value. It should be noted that the predetermined delayed time for the delay circuit 518 is longer than the time when the phase controller 502 performs the above-described processing and is shorter than the cycle at which the switching signal is output from the control switcher 515.

Figure 11:
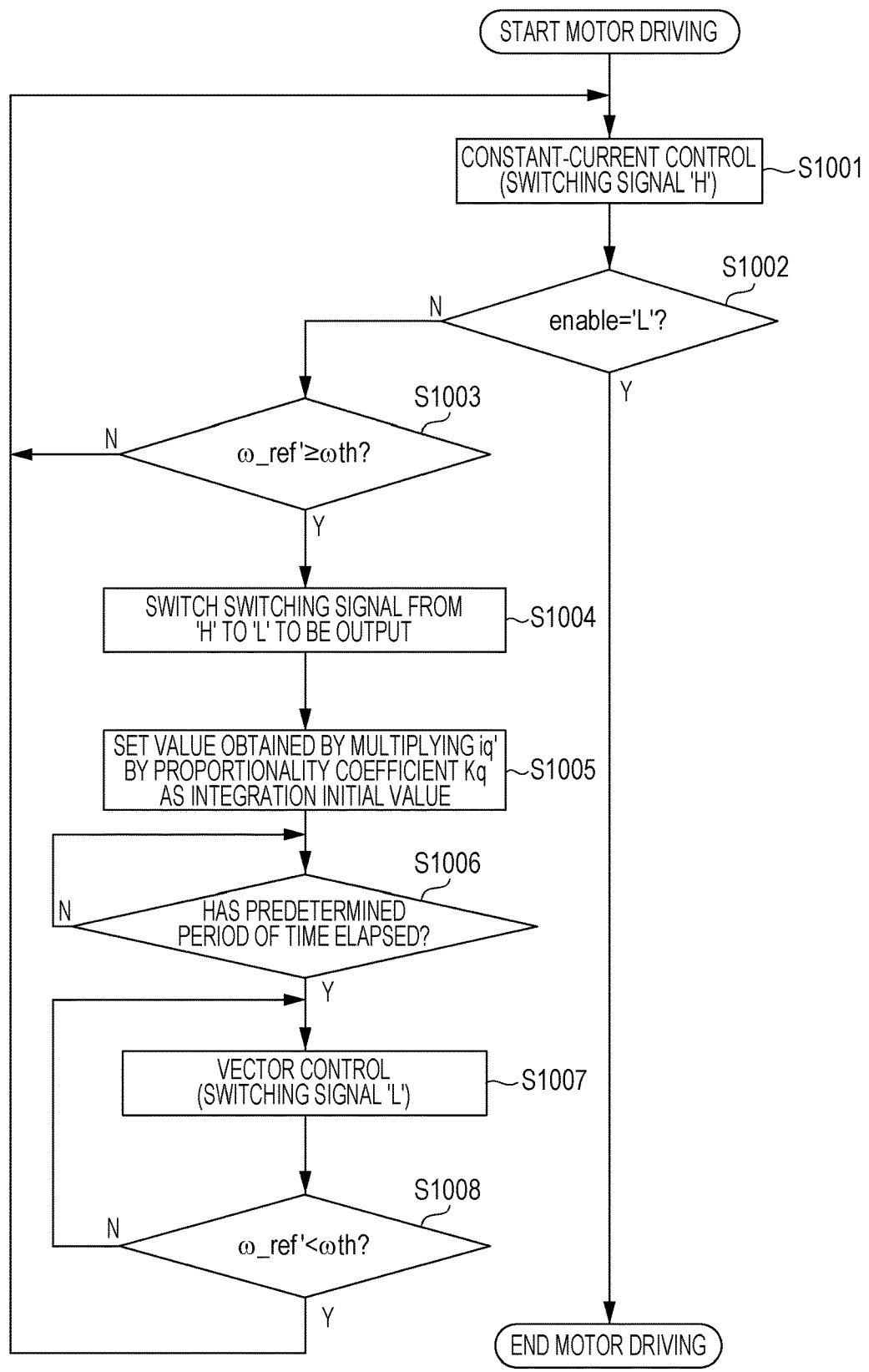
FIG. 11 is a flow chart illustrating a motor control method according to the first embodiment.

FIG. 11 is a flow chart illustrating the motor control method by the motor control apparatus 157. Hereinafter, the control of the motor 509 according to the present embodiment will be described with reference to FIG. 11. The processing of this flow chart is executed by the motor control apparatus 157 that has received the instruction from the CPU 151a.

First, when an enable signal 'H' is output from the CPU 151a to the motor control apparatus 157, the motor control apparatus 157 starts driving of the motor 509 on the basis of the instructed output from the CPU 151a. The enable signal is a signal for permitting or prohibiting the running of the motor control apparatus 157. In a case where the enable signal is "L (low level)", the CPU 151a prohibits the running of the motor control apparatus 157. That is, the control of the motor 509 by the motor control apparatus 157 is ended. On the other hand, in a case where the enable signal is "H (high level)", the CPU 151a permits the running of the motor control apparatus 157, and the motor control apparatus 157 performs the control of the motor 509 on the basis of the instructed output from the CPU 151a.

Next, in S1001, the control switcher 515 outputs the switching signal 'H' such that a state in which the driving of the motor 509 is controlled by the constant-current controller 700 is established. As a result, the constant-current control by the constant-current controller 700 is performed.

Thereafter, in S1002, in a case where the CPU 151a outputs the enable signal 'L' to the motor control apparatus 157, the motor control apparatus 157 ends the driving of the motor 509.

On the other hand, in S1002, in a case where the CPU 151a outputs the enable signal 'H' to the motor control apparatus 157, the motor control apparatus 157 advances the processing to S1003.

Next, in S1003, in a case where the rotation speed ω_ref' is lower than the threshold ωth, the processing returns to S1001 again. That is, the constant-current control by the constant-current controller 700 is continued.

On the other hand, in S1003, in a case where the rotation speed ω_ref' is higher than or equal to the threshold ωth, in S1004, the control switcher 515 switches the switching signal from 'H' to 'L' and outputs the switching signal.

Thereafter, in S1005, the integral control unit 502b deletes the integration results up to a point immediately before the switching signal is switched to 'L' and sets the current value iq' obtained immediately before the switching signal is switched as the integration initial value to be output.

Subsequently, in S1006, when the predetermined delayed time has elapsed, in S1007, the switching signal 'L' is output from the delay circuit 518 to the switches 516a and 516b. As a result, the vector control by the vector controller 701 is performed.

In S1008, in a case where the rotation speed ω_ref' is higher than or equal to the threshold ωth, the processing returns to S1007 again, and the vector control by the vector controller 701 is continued.

On the other hand, S1008, in a case where the rotation speed ω_ref' is lower than the threshold ωth, the processing returns to S1001 again, and the control switcher 515 switches the driving of the controller that controls the motor 509. That is, the control switcher 515 switches the switching signal from 'L' to 'H' such that the controller that controls the motor 509 is switched from the vector controller 701 to the constant-current controller 700 and outputs the switching signal. After the elapse of the predetermined delayed time since the switching signal is output from the control switcher 515, the delay circuit 518 outputs the input switching signal to the switches 516a and 516b. As a result, the states of the switches 516a and 516b are switched, and the constant-current control by the constant-current controller 700 is performed.

Thereafter, until the CPU 151a outputs the enable signal 'L' to the motor control apparatus 157, the motor control apparatus 157 repeatedly performs the above-described control. It should be noted that, in a case where the CPU 151a outputs the enable signal 'L' to the motor control apparatus 157 even during the vector control, the motor control apparatus 157 cancels the motor control.

As described above, according to the present embodiment, the current value iq' corresponding to the load torque applied to the rotor is determined on the basis of the current values detected during the constant-current control. Subsequently, the q-axis current instructed value iq_ref immediately after the switching signal is switched from 'H' to 'L' is generated based on the current value iq' immediately before the switching signal is switched from 'H' to 'L'. Specifically, the value based on the current value iq' as the current detection result is set as the integration initial value in the phase controller 502. As a result, it is possible to suppress the generation of the difference between the torque generated in the rotor corresponding to the current provided immediately before the motor control is switched and the torque generated in the rotor corresponding to the current provided immediately after the motor control is switched. As a result, when the motor control is switched from the constant-current control to the vector control, it is possible to suppress the fluctuation of the rotation speed of the motor.

Figure 12A:
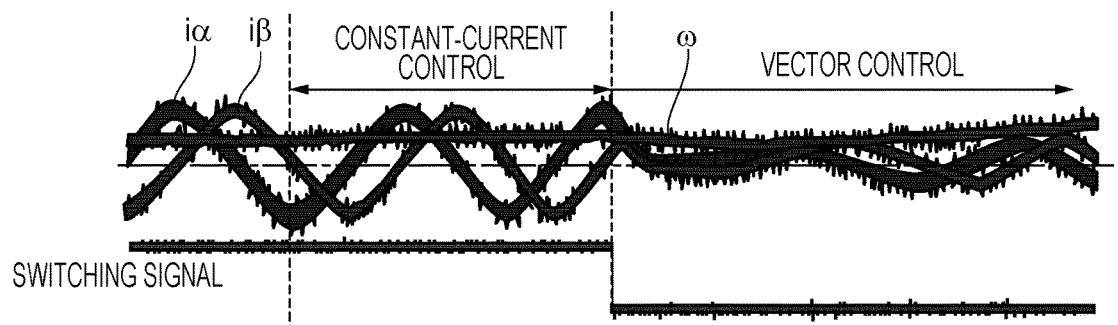
FIGS. 12A, 12B, and 12C illustrate experimental results representing changes in waveforms of driving currents and driving voltages and the rotation speed which are accompanied by switching of motor control methods.
Figure 12B:
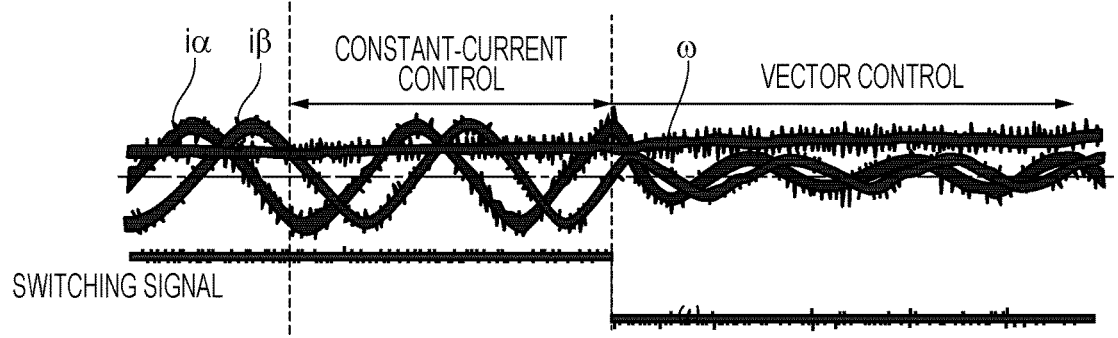
Figure 12C:
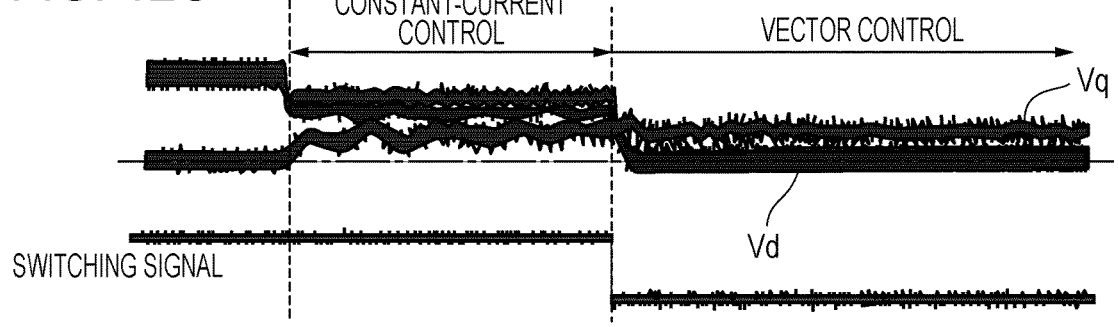

FIGS. 12A, 12B, and 12C illustrate experimental results representing changes in waveforms of the driving currents and the driving voltages and the rotation speed which are accompanied by switching of the motor control methods. It should be noted that the rotation speed in FIGS. 12A, 12B, and 12C is measured by attaching a rotary encoder to the motor for experiments.

FIG. 12A illustrates the current values iα and iβ in the stationary coordinate system and a rotation speed ω in a state in which the present embodiment is not applied to the motor control apparatus 157, that is, the initial value of the integral control unit 502b is not set on the basis of the current value iq' during the constant-current control. As illustrated in FIG. 12A, in a case where the present embodiment is not applied to the motor control apparatus 157, since the initial value of the integral control unit 502b is not an appropriate value for the rotor to rotate (for example, the initial value is 0), the current value immediately after the switching from the constant-current control to the vector control is not an appropriate value for the rotor to rotate (approximately 0). This means that the torque is not generated in the rotor immediately after the switching from the constant-current control to the vector control. That is, it means that a difference between the torque generated in the rotor corresponding to the current provided immediately before the motor control is switched and the torque generated in the rotor corresponding to the current provided immediately after the motor control is switched occurs. As a result, the rotation speed ω fluctuates when the motor control is switched from the constant-current control to the vector control.

FIG. 12B illustrates the current values iα and iβ in the stationary coordinate system and the rotation speed ω based on the signal of the rotary encoder in a state in which the present embodiment is applied to the motor control apparatus 157. As illustrated in FIG. 12B, in a case where the present embodiment is applied to the motor control apparatus 157, since the initial value of the integral control unit 502b is set on the basis of the current value iq', a current waveform even immediately after the switching from the constant-current control to the vector control is changed to be sinusoid. This means that the torque is generated in the rotor also immediately after the switching from the constant-current control to the vector control. Furthermore, according to the present embodiment, since the initial value of the integral control unit 502b is set on the basis of the current value iq' detected during the constant-current control, it is possible to reduce the difference between the torque applied to the rotor during the constant-current control and the torque applied to the rotor immediately after the control switching as much as possible. That is, it is possible to suppress the generation of the difference between the torque generated in the rotor corresponding to the current provided immediately before the motor control is switched and the torque generated in the rotor corresponding to the current provided immediately after the motor control is switched. As a result, when the motor control is switched from the constant-current control to the vector control, it is possible to suppress the fluctuation of the rotation speed of the motor.

FIG. 12C illustrates the driving voltages Vd and Vq in the rotating coordinate system in a state in which the present embodiment is applied to the motor control apparatus 157. According to the present embodiment, the current controllers 503 and 504 generate the driving voltages Vq and Vd on the basis of the deviation between the current values in the rotating coordinate system by either the constant-current control or the vector control. That is, an integral control unit in the current controller is used in both the constant-current control and the vector control. Therefore, the control of the integral control unit in the current controller immediately after the motor control is switched from the constant-current control to the vector control is performed on the basis of the integral value of the integral control unit immediately before the motor control is switched from the constant-current control to the vector control. As illustrated in FIG. 12C, when the above-described configuration is adopted, it is possible to suppress the abrupt fluctuations of the values of the driving voltages Vq and Vd at the time of the control switching. As a result, it is possible to suppress the occurrence of the state in which the motor control becomes unstable.

Second Embodiment

Since the configuration of the image forming apparatus is similar to that of the first embodiment, descriptions thereof will be omitted.

According to the first embodiment, the constant-current control is performed on the basis of the deviation between the current instructed value iq_ref and the current value iq and the deviation between the current instructed value id_ref and the current value id in the rotating coordinate system based on the instructed phase θ_ref. According to the present embodiment, the configuration will be described in which the constant-current control is performed on the basis of the deviation between the current instructed value iα_ref and the current value iα in the stationary coordinate system and the deviation between the current instructed value iβ_ref and the current value iβ in the stationary coordinate system. It should be noted that, in the following explanation, descriptions will be omitted with regard to parts of the configuration of the vector control and the configuration for switching the motor control which are similar to those of the first embodiment.

Constant-Current Control

Figure 13:
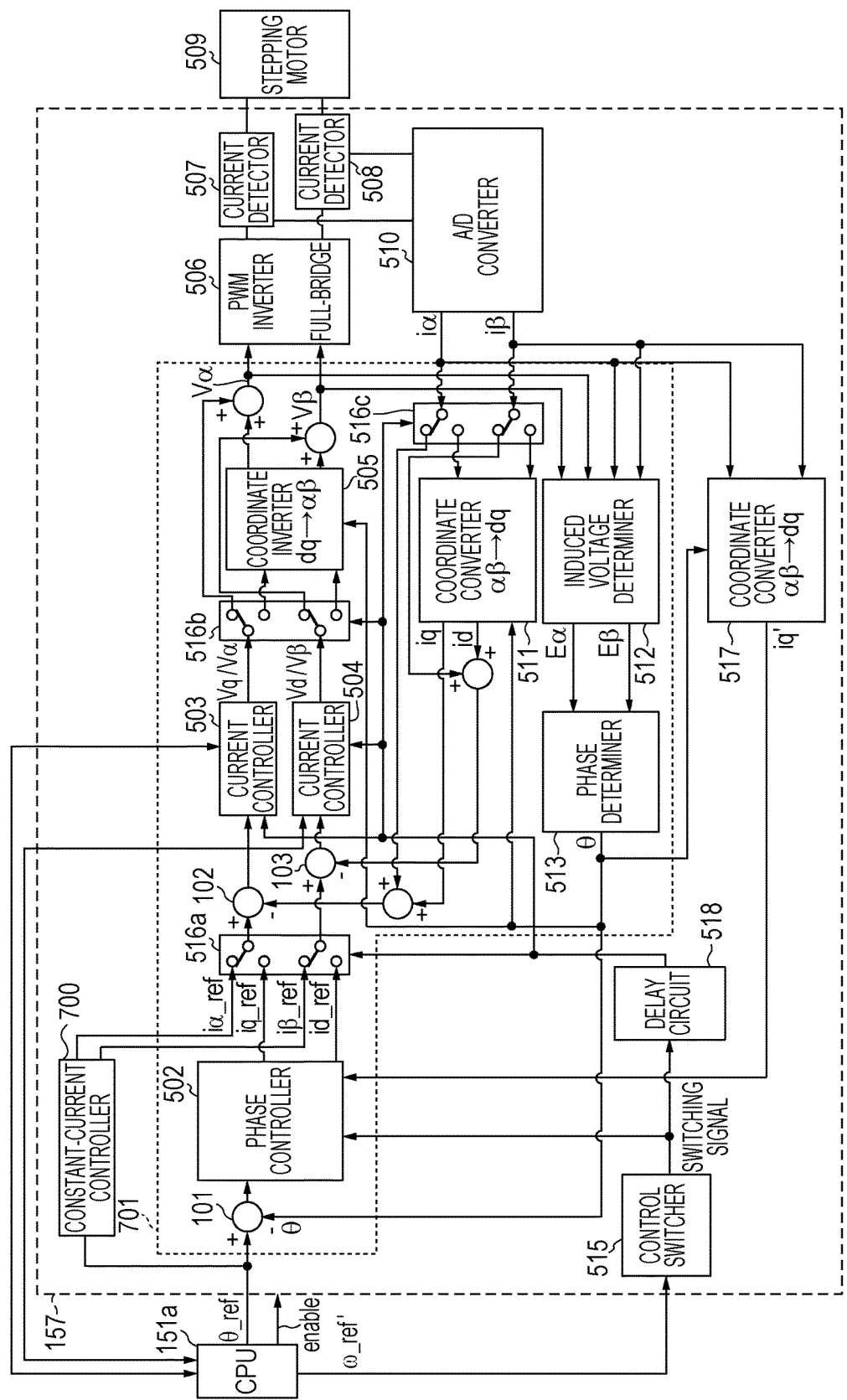
FIG. 13 is a block diagram illustrating an example of a configuration of the motor control apparatus according to a second embodiment.

FIG. 13 is a block diagram illustrating an example of a configuration of the motor control apparatus 157 according to the present embodiment. It should be noted that the motor control apparatus 157 is constituted by at least one ASIC and executes respective functions which will be described below.

The CPU 151a outputs the instructed phase θ_ref to the constant-current controller 700. The constant-current controller 700 generates the current instructed values iα_ref and iβ_ref, which corresponds to the instructed phase θ_ref output from the CPU 151a, in the stationary coordinate system.

Next, the current detectors 507 and 508 detect the driving currents flowing through the windings in the A phase and the B phase of the motor 509. Thereafter, the detected driving currents are converted from the analog values into the digital values by the A/D converter 510 and represented as the current values iα and iβ as in Expressions (1) and (2).

The current instructed value iβ_ref output from the constant-current controller 700 is input to the subtractor 102 via the switch 516a. The current value iα output from the A/D converter 510 is input to the subtractor 102 via a switch 516c. The subtractor 102 outputs the deviation between the current value iα and the current instructed value iα_ref to the current controller 503.

The current instructed value iβ_ref output from the constant-current controller 700 is input to the subtractor 103 via the switch 516a. The current value iβ output from the A/D converter 510 is input to the subtractor 103 via the switch 516c. The subtractor 103 outputs the deviation between the current value iβ and the current instructed value iβ_ref to the current controller 504.

Figure 14:
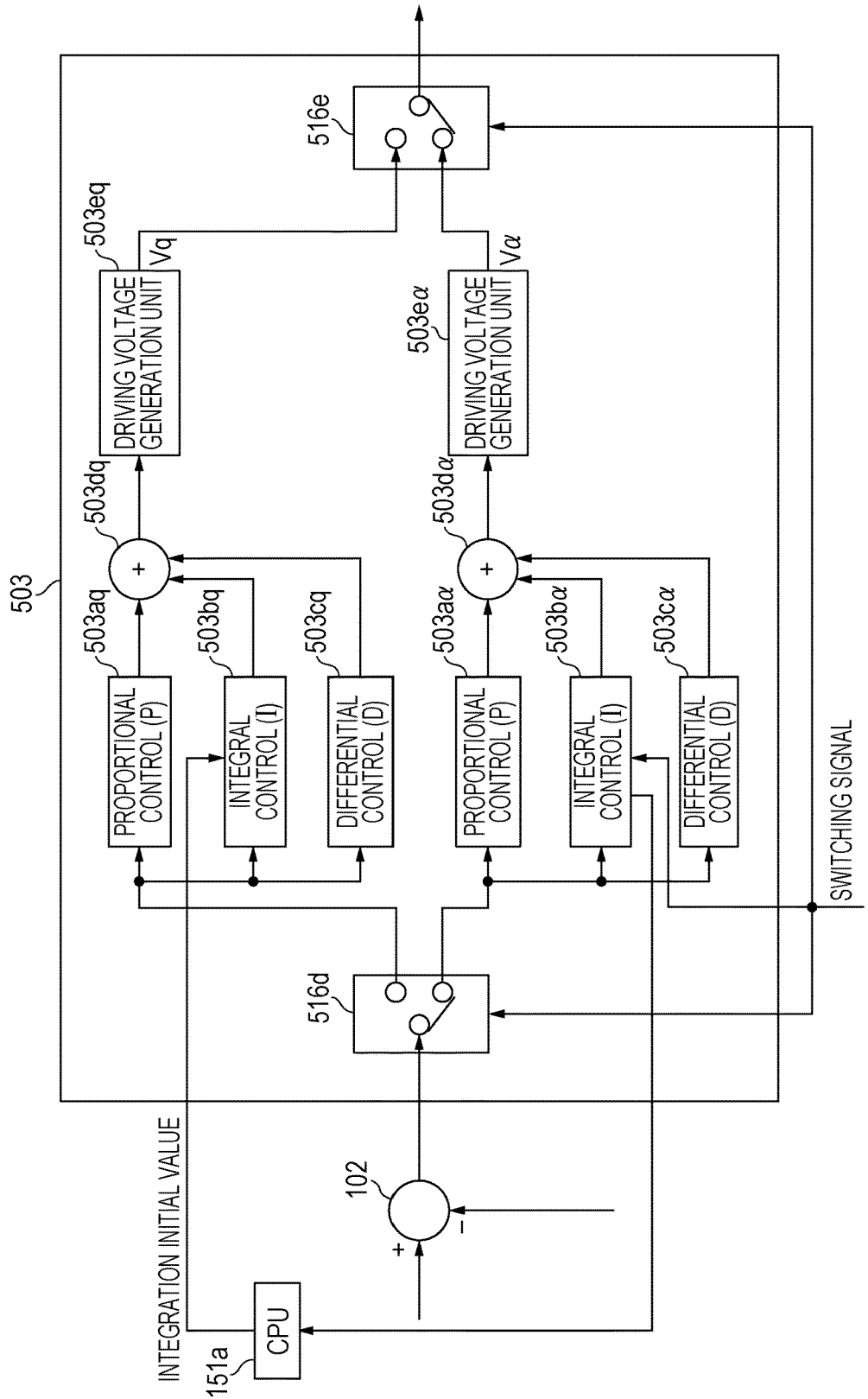
FIG. 14 is a block diagram illustrating a configuration of the current controller according to the second embodiment.

FIG. 14 is a block diagram illustrating a configuration of the current controller 503 according to the present embodiment. It should be noted that the configuration of the current controller 503 illustrated in FIG. 14 is an example according to the present embodiment, and the configuration of the current controller 503 is not intended to be limited to this.

As illustrated in FIG. 14, the current controller 503 includes a proportional control unit 503aq that performs the P control, an integral control unit 503bq that performs the I control, and a differential control unit 503cq that performs the D control in a case where the vector control is performed. The current controller 503 also includes an adder 503dq that adds signals output from a proportional control unit 502aq, an integral control unit 502bq, and a differential control unit 502cq to one another. Furthermore, the current controller 503 includes a driving voltage generation unit 503eq that generates the driving voltage Vq as the value of the q-axis component of the voltage vector corresponding to the driving voltage to be applied to the winding of the motor 509. It should be noted that, since the processing methods for the respective configurations are similar to the method described according to the first embodiment, descriptions thereof will be omitted.

The current controller 503 also includes a proportional control unit 503aα that performs the P control, an integral control unit 503bα that performs the I control, and a differential control unit 503cα that performs the D control in a case where the constant-current control is performed. The current controller 503 also includes an adder 503dα that adds signals output from a proportional control unit 502aα, an integral control unit 502bα, and a differential control unit 502cα to one another. Furthermore, the current controller 503 includes a driving voltage generation unit 503eα that generates a driving voltage Vα based on the signal output from the adder 503dα as a value of an α axis component of the voltage vector corresponding to the driving voltage to be applied to the winding of the motor 509.

In the constant-current control, the current controller 503 generates the driving voltage Vα based on the PID control such that the deviation input via a switch 516d is decreased. Specifically, the current controller 503 generates the driving voltage Vα such that the input deviation becomes 0.

More specifically, the proportional control unit 503aα outputs the value in proportion to the deviation such that the deviation output from the subtractor 102 becomes 0. The integral control unit 503bα outputs the value in proportion to the temporal integration of the deviation such that the deviation output from the subtractor 102 becomes 0. The differential control unit 503cα outputs the value in proportion to the temporal change of the deviation such that the deviation output from the subtractor 102 becomes.

Subsequently, the adder 503dα adds the values output from the proportional control unit 503aα, the integral control unit 503bα, the differential control unit 503cα to one another, and the added value is output to the driving voltage generation unit 503eα. The driving voltage generation unit 503eα generates the driving voltage Vα based on the value output from the adder 503dα and outputs the driving voltage Vα. Specifically, for example, the driving voltage Vα is generated by multiplying the value output from the adder 503d by a previously set proportionality coefficient and output via a switch 516e.

In this manner, the current controller 503 functions as a generation unit configured to generate the driving voltage. It should be noted that the current controller 504 has a configuration similar to that of the current controller 503 and generates the driving voltage Vβ as a value of a β-axis component of the voltage vector corresponding to the driving voltage to be applied to the winding of the motor 509 by a method similar to that of the current controller 503.

It should be noted that the current controllers 503 and 504 according to the present embodiment generates the driving voltages Vα and Vβ on the basis of the PID control, but the configuration is not limited to this. For example, the current controllers 503 and 504 may also generate the driving voltages Vα and Vβ on the basis of the PI control.

The driving voltages Vα and Vβ output from the current controllers 503 and 504 are input to the PWM inverter 506 via the switch 516b, and the PWM inverter 506 provides the driving currents to the windings in the respective phases of the motor 509 to drive the motor 509 according a method similar to that of the first embodiment.

In this manner, neither the phase feedback control nor the speed feedback control is performed in the constant-current control. That is, the driving current provided to the winding is not adjusted in accordance with the rotation state of the rotor in the constant-current control. Therefore, the current obtained by adding the predetermined margin to the current used for rotating the rotor is provided to the winding in the constant-current control, such that the motor is not put into the step-out state. Specifically, the current instructed values iα_ref and iβ_ref in the stationary coordinate system include the current values used for rotating the rotor and the current values corresponding to the predetermined margins.

The constant-current control according to the present embodiment has been described above. It should be noted that, according to the present embodiment, as illustrated in FIG. 13, when the motor control is switched, the control switcher 515 outputs the switching signal to the switch 516a to 516e.

Processing of the Current Controllers at the Time of the Control Switching

In a case where the current controllers 503 and 504 include the configuration of the PID control used in the constant-current control (for the stationary coordinate system) and the configuration of the PID control used in the vector control (for the rotating coordinate system), there is a possibility that the following issue occurs. Specifically, when the motor control is switched from the constant-current control to the vector control, there is a possibility that the driving voltages Vq and Vd immediately after the motor control is switched from the constant-current control to the vector control are generated on the basis of the integral control unit in a state in which the initial value is not appropriate (which is 0). In a case where the initial value is not appropriate, there is a possibility that the driving voltages Vq and Vd abruptly fluctuate (change in a discontinuous manner) when the motor control is switched from the constant-current control to the vector control, and the motor control becomes unstable.

In view of the above, according to the present embodiment, with the application of the following configuration, it is possible to suppress the abrupt change of the driving voltages Vq and Vd when the motor control is switched from the constant-current control to the vector control. Specifically, as illustrated in FIG. 14, when the motor control is switched from the constant-current control to the vector control, the CPU 151a sets the integration initial value of the integral control unit 503bq based on the integral value of the integral control unit 503bα immediately before the switching signal is switched from 'H' to 'L'.

When the above-described configuration is used, it is possible to perform the gradual change without the abrupt fluctuations of the values of the driving voltages Vq and Vd at the time of the control switching. As a result, it is possible to suppress the occurrence of the state in which the motor control becomes the unstable.

It should be noted that, according to the present embodiment, the CPU 151a sets (determines) the integration initial value of the integral control unit 503bq based on the integral value of the integral control unit 503bα immediately before the switching signal is switched from 'H' to 'L', but the configuration is not limited to this. For example, when the motor control is switched from the constant-current control to the vector control, the CPU 151a may set the integration initial value of the integral control unit 503bq as a previously determined value.

In addition, according to the present embodiment, the CPU 151a sets (determines) the integration initial value of the integral control unit 503bq based on the integral value of the integral control unit 503bα immediately before the switching signal is switched, but the configuration is not limited to this. For example, the CPU 151*a* may also set the integration initial value of the integral control unit 502*bq* based on the integral value of the integral control unit 503*bα* obtained when the switching signal is switched at the last time but one instead of the integral value obtained immediately before the switching signal is switched.

The motor control apparatus according to the present embodiment includes partially shared parts (such as the current controllers 503 and 504 and the PWM inverter 506) in the circuit that performs the vector control and the circuit that performs the constant-current control, but the configuration is not limited to this. For example, a configuration may also be adopted in which the circuit that performs the vector control and the circuit that performs the constant-current control are respectively independently provided.

In the constant-current control according to the first embodiment and the second embodiment, the current obtained by adding the predetermined margin to the current used for rotating the rotor is provided to the winding such that the motor is not put into the step-out state. For this reason, the current value iq' also includes the value corresponding to the above-described margin.

According to the first embodiment and the second embodiment, the phase controller 502 sets the value obtained by multiplying the current value iq' by the proportionality coefficient Kq as the integration initial value in the integral control unit 502*b*, but the configuration is not limited to this. For example, the phase controller 502 may also set a value obtained by subtracting a predetermined value from the current value iq' as the integration initial value in the integral control unit 502*b*. In addition, the current value iq' may be set as the integration initial value in the integral control unit 502*b* as it is.

In addition, according to the first embodiment and the second embodiment, the integration initial value in the integral control unit 502*b* is set on the basis of the current value iq' obtained immediately before the switching signal is switched, but the configuration is not limited to this. For example, the integration initial value in the integral control unit 502*b* may also be set on the basis of the current value iq' obtained when the switching signal is switched at the last time but one instead of the current value iq' obtained immediately before the switching signal is switched.

In addition, according to the first embodiment and the second embodiment, the phase controller 502 sets the value corresponding to the current value iq' as the integration initial value in the integral control unit 502*b* and generates the q-axis current instructed value iq_ref by the PID control based on the set initial value, but the configuration is not limited to this. For example, the phase controller 502 may set the current value iq' as the q-axis current instructed value iq_ref as it is. It should be noted that, in a case where the current value iq' is output as the q-axis current instructed value iq_ref as it is, since the integration initial value in the integral control unit 502*b* is 0, the integral control is performed in a state in which the initial value is 0 at the time of the next PID control. Therefore, in this case, until the feedback of the rotation phase θ (integral control by the q-axis current instructed value iq_ref based on the current value iq') is performed at least once, the current value iq' is output as the q-axis current instructed value iq_ref as it is. That is, the q-axis current instructed value iq_ref based on the PID control is generated by the feedback of the rotation phase θ which is performed in the second and subsequent times. Even in a case where the current value iq' is output as the q-axis current instructed value iq_ref as it is, the above-described configuration is not needed if the configuration is adopted in which the current value iq' is set as the initial value of the integral control unit. That is, until the feedback of the rotation phase θ is performed at least once, the configuration is not needed in which the current value iq' is output as the q-axis current instructed value iq_ref as it is.

In addition, according to the first embodiment and the second embodiment, the configuration is adopted in which the phase controller 502 operates during the constant-current control, but the phase controller 502 may also stop. Specifically, for example, it is sufficient that the configuration is adopted in which the integral control unit operates among the configurations provided in the phase controller 502 during the constant-current control.

In addition, according to the first embodiment and the second embodiment, the circuit that controls the driving of the motor 509 by using the vector controller 701 is equivalent to a first control circuit. Furthermore, the circuit that controls the driving of the motor 509 by using the constant-current controller 700 according to the first embodiment and the second embodiment is equivalent to a second control circuit.

Figure 15:
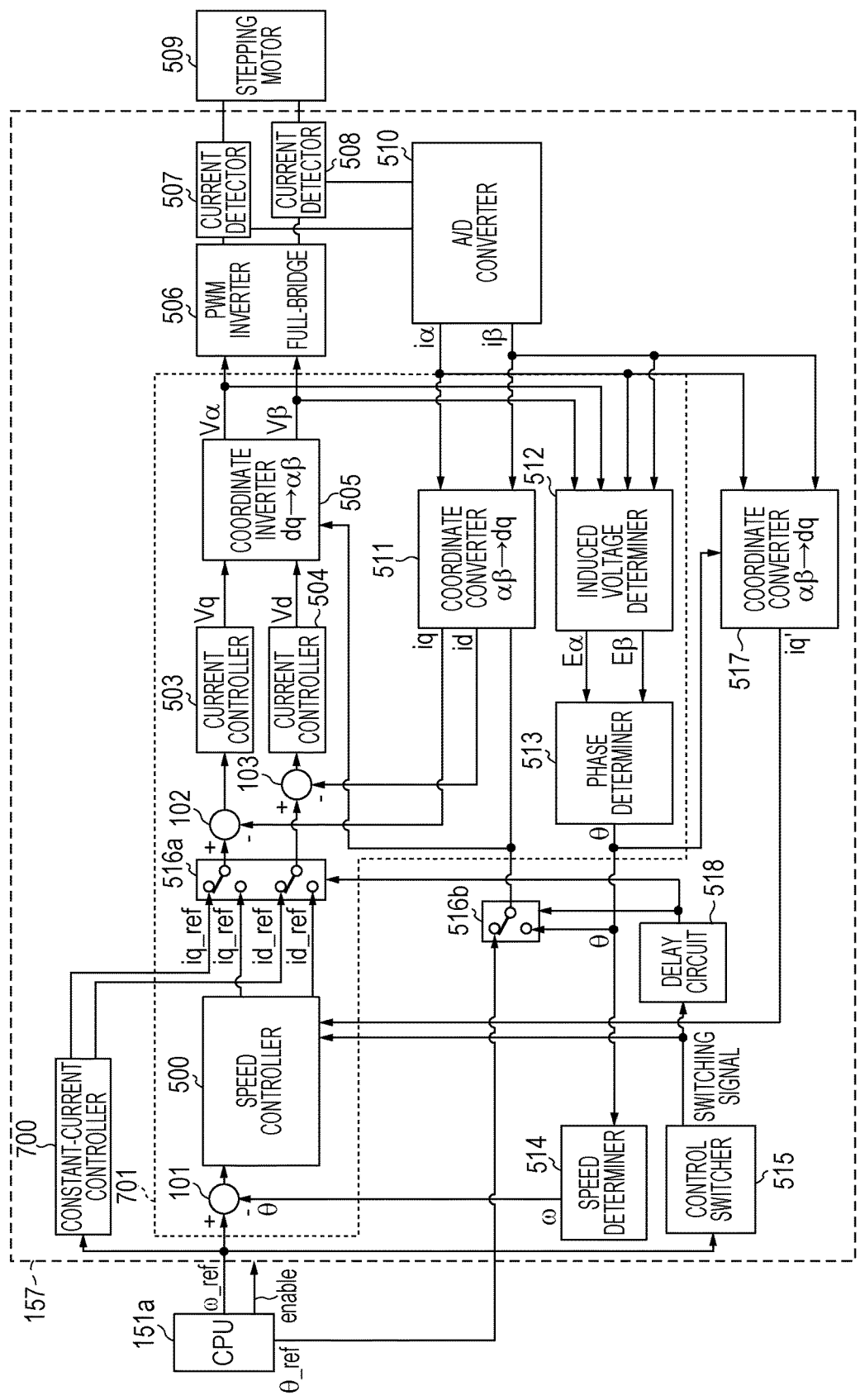
FIG. 15 is a block diagram illustrating the configuration of the motor control apparatus that performs speed feedback control.

In the vector control according to the first embodiment and the second embodiment, the motor 509 is controlled by performing the phase feedback control, but the configuration is not limited to this. For example, a configuration may be adopted in which the motor 509 is controlled by feeding back the rotation speed ω of the rotor 402. Specifically, as illustrated in FIG. 15, a speed determiner 514 is provided inside the motor control apparatus, and the speed determiner 514 determines the rotation speed ω on the basis of the change amount of the rotation phase θ in a predetermined period. It should be noted that the following Expression (10) is used to determine the speed.

$$\omega = d\theta/dt \tag{10}$$

Subsequently, the CPU 151*a* outputs an instructed speed ω_ref indicating the target speed of the rotor. Furthermore, a configuration is adopted in which a speed controller 500 is provided in the motor control apparatus, and the speed controller 500 generates and outputs the q-axis current instructed value iq_ref such that the deviation between the rotation speed ω and the instructed speed ω ref is decreased. A configuration may also be adopted in which the motor 509 is controlled by performing the above-described speed feedback control. Since the rotation speed is fed back in the above-described configuration, it is possible to perform the control such that the rotation speed of the rotor becomes a predetermined speed. Therefore, the vector control using the speed feedback control is applied to the motor that drives the load where the rotation speed is controlled to be the constant speed (for example, the photosensitive drum, the conveyance belt, and the like) to appropriately perform the image formation onto the recording medium in the image forming apparatus. As a result, it is possible to appropriately perform the image formation onto the recording medium. It should be noted that, in this case, the instructed speed ω_ref is used also when the constant-current control is performed. The switching of the control may be performed on the basis of the instructed speed ω_ref or may also be performed on the basis of the rotation speed ω determined by the speed determiner 514.

In addition, according to the first embodiment and the second embodiment, the rotation speed ω_ref is determined on the basis of the change amount over the predetermined period of the instructed phase θ_ref, but the configuration is not limited to this. For example, the rotation speed ω_ref' may also be determined on the basis of a cycle in which a magnitude of a periodic signal becomes 0 which has a correlation with the rotation cycle of the rotor 402 such as the driving current iα or iβ, the driving voltage Vα or Vβ, or the induced voltage Eα or Eβ.

In addition, according to the first embodiment and the second embodiment, the stepping motor is used as the motor that drives the load, but other motors such as a DC motor may also be used. In addition, the motor is not limited to the case of the two-phase motor, and the present embodiment can also be applied to other motors such as a three-phase motor.

In addition, according to the first embodiment and the second embodiment, the permanent magnet is used as the rotor, but the configuration is not limited to this.

According to the embodiments, the occurrence of the state in which the motor control becomes unstable can be suppressed when the control mode for controlling the motor is switched.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-085469 filed Apr. 24, 2017, which is hereby incorporated by reference herein in its entirety.

What is claimed is:

1. A motor control apparatus to control a motor based on an instructed phase indicating a target phase of a rotor of the motor, the motor control apparatus comprising:
   a detector configured to detect a driving current flowing through a winding of the motor;
   a phase determiner configured to determine a rotation phase of the rotor based on the driving current detected by the detector; and
   a controller including a first control mode for controlling the driving current in a manner that a magnitude of the driving current detected by the detector becomes a target value set in a manner that a phase deviation between the instructed phase indicating the target phase of the rotor of the motor and the rotation phase determined by the phase determiner is decreased, and a second control mode for controlling the driving current based on a current having a previously determined magnitude,
   wherein, in a case where the control mode for controlling the driving current is switched from the second control mode to the first control mode, the target value in the first control mode is set based on a value of the driving current detected by the detector during execution of the second control mode.

2. The motor control apparatus according to claim 1,
   wherein the first control mode is a control mode in which integral control is performed based on the phase deviation to decrease the phase deviation, and the driving current is controlled in a manner that the magnitude of the driving current detected by the detector becomes the target value set based on the integral control, and
   wherein, in a case where the control mode for controlling the driving current is switched from the second control mode to the first control mode, an initial value of the integral control in the first control mode is set based on the value of the driving current detected by the detector during the execution of the second control mode.

3. The motor control apparatus according to claim 2,
   wherein the initial value of the integral control is set based on a value lower than the value of the driving current detected by the detector during the execution of the second control mode,
   wherein the value lower than the value of the driving current detected by the detector is determined based on the value of the driving current detected by the detector during the execution of the second control mode, and
   wherein the controller sets a target value based on the initial value of the integral control which is set based on the value lower than the value of the driving current detected by the detector.

4. The motor control apparatus according to claim 3, wherein the value lower than the value of the driving current detected by the detector is a value proportional to the value of the driving current detected by the detector during the execution of the second control mode.

5. The motor control apparatus according to claim 2,
   wherein the first control mode is a control mode for controlling the driving current in a manner that the value of the driving current becomes a target value of the driving current set to decrease the phase deviation, and
   wherein the target value of the driving current is set based on the integral control in which the initial value is set.

6. The motor control apparatus according to claim 1,
   wherein the detector detects the driving current at a predetermined cycle, and
   wherein the target value of the driving current is set based on the value of the driving current lastly detected by the detector before the control mode is switched from the second control mode to the first control mode.

7. The motor control apparatus according to claim 1, wherein, in a case where a rotation speed corresponding to a target speed of the rotor takes a value higher than a predetermined value during the execution of the second control mode, the controller switches the control mode for controlling the driving current from the second control mode to the first control mode.

8. The motor control apparatus according to claim 7,
   wherein the controller includes an induced voltage determiner configured to determine a magnitude of an induced voltage in the winding in a first phase and a magnitude of an induced voltage in the winding in a second phase, which are induced by rotation of the rotor of the motor, based on the driving current detected by the detector, and
   wherein the phase determiner determines the rotation phase of the rotor of the motor based on the magnitude of the induced voltage in the first phase and the magnitude of the induced voltage in the second phase determined by the induced voltage determiner.

9. The motor control apparatus according to claim 8, wherein the predetermined value is set as the rotation speed at which the phase determiner can determine the rotation phase of the rotor of the motor based on the magnitude of the induced voltage in the first phase and the magnitude of the induced voltage in the second phase which are determined by the induced voltage determiner.

10. The motor control apparatus according to claim 7, wherein the rotation speed corresponding to the target speed changes at a second predetermined cycle.

11. The motor control apparatus according to claim 10, wherein the second predetermined cycle is the same cycle as a cycle at which the controller controls the motor.

12. The motor control apparatus according to claim 10, wherein the second predetermined cycle is the same cycle as a cycle at which the detector detects the driving current.

13. The motor control apparatus according to claim 1,
wherein the first control mode is a control mode for controlling a value of an excitation current component of the driving current detected by the detector to be set as zero and controlling a value of a torque current component of the driving current detected by the detector to control the motor,
wherein the excitation current component is a current component represented by a rotational coordinate system based on the rotation phase determined by the phase determiner and a current component affecting an intensity of magnetic flux penetrating through the winding, and
wherein the torque current component is a current component represented by the rotational coordinate system and a current component generating torque on the rotor.

14. A motor control apparatus to control a motor based on an instructed speed indicating a target speed of a rotor of the motor, the motor control apparatus comprising:
a detector configured to detect a driving current flowing through a winding of the motor;
a speed determiner configured to determine a rotation speed of the rotor; and
a controller including a first control mode for controlling the driving current in a manner that a magnitude of the driving current detected by the detector becomes a target value set in a manner that a speed deviation between the instructed speed indicating the target speed of the rotor of the motor and the rotation speed determined by the speed determiner is decreased, and a second control mode for controlling the driving current based on a current having a previously determined magnitude,
wherein, in a case where the control mode for controlling the driving current is switched from the second control mode to the first control mode, the target value in the first control mode is set based on a value of the driving current detected by the detector during execution of the second control mode.

15. A sheet conveyance apparatus to convey a sheet, the sheet conveyance apparatus comprising:
a conveyance roller configured to convey the sheet;
a motor configured to drive the conveyance roller;
a detector configured to detect a driving current flowing through a winding of the motor;
a phase determiner configured to determine a rotation phase of a rotor of the motor based on the driving current detected by the detector; and
a controller including a first control mode for controlling the driving current in a manner that a magnitude of the driving current detected by the detector becomes a target value set in a manner that a phase deviation between an instructed phase indicating a target phase of the rotor of the motor and the rotation phase determined by the phase determiner is decreased, and a second control mode for controlling the driving current based on a current having a previously determined magnitude,
wherein, in a case where the control mode for controlling the driving current is switched from the second control mode to the first control mode, the target value in the first control mode is set based on a value of the driving current detected by the detector during execution of the second control mode.

16. A document feeding apparatus to feed a document, the document feeding apparatus comprising:
a document tray onto which a document is to be stacked;
a conveyance roller configured to convey the document stacked onto the document tray;
a motor configured to drive the conveyance roller;
a detector configured to detect a driving current flowing through a winding of the motor;
a phase determiner configured to determine a rotation phase of a rotor of the motor based on the driving current detected by the detector; and
a controller including a first control mode for controlling the driving current in a manner that a magnitude of the driving current detected by the detector becomes a target value set in a manner that a phase deviation between an instructed phase indicating a target phase of the rotor of the motor and the rotation phase determined by the phase determiner is decreased, and a second control mode for controlling the driving current based on a current having a previously determined magnitude,
wherein, in a case where the control mode for controlling the driving current is switched from the second control mode to the first control mode, the target value in the first control mode is set based on a value of the driving current detected by the detector during execution of the second control mode.

17. A document reading apparatus to read an image of a document, the document reading apparatus comprising:
a document tray onto which a document is to be stacked;
a conveyance roller configured to convey the document stacked onto the document tray;
a reading unit configured to read the document conveyed by the conveyance roller;
a motor configured to drive the conveyance roller;
a detector configured to detect a driving current flowing through a winding of the motor;
a phase determiner configured to determine a rotation phase of a rotor of the motor based on the driving current detected by the detector; and
a controller including a first control mode for controlling the driving current in a manner that a magnitude of the driving current detected by the detector becomes a target value set in a manner that a phase deviation between an instructed phase indicating a target phase of the rotor of the motor and the rotation phase determined by the phase determiner is decreased, and a second control mode for controlling the driving current based on a current having a previously determined magnitude,
wherein, in a case where the control mode for controlling the driving current is switched from the second control mode to the first control mode, the target value in the first control mode is set based on a value of the driving current detected by the detector during execution of the second control mode.

18. An image forming apparatus to form an image on a recording medium, the image forming apparatus comprising:
an image forming unit configured to form the image on the recording medium;
a motor configured to drive load;
a detector configured to detect a driving current flowing through a winding of the motor;
a phase determiner configured to determine a rotation phase of a rotor of the motor based on the driving current detected by the detector; and a controller including a first control mode for controlling the driving current in a manner that a magnitude of the driving current detected by the detector becomes a target value set in a manner that a phase deviation between an instructed phase indicating a target phase of the rotor of the motor and the rotation phase determined by the phase determiner is decreased, and a second control mode for controlling the driving current based on a current having a previously determined magnitude, wherein, in a case where the control mode for controlling the driving current is switched from the second control mode to the first control mode, the target value in the first control mode is set based on a value of the driving current detected by the detector during execution of the second control mode.

19. The image forming apparatus according to claim 18, wherein the load is a conveyance roller that, when driven by the motor, conveys the recording medium.

20. The image forming apparatus according to claim 18, wherein the first control mode is a control mode in which integral control is performed based on the phase deviation to decrease the phase deviation, and the driving current is controlled in a manner that the magnitude of the driving current detected by the detector becomes the target value set based on the integral control, and wherein, in a case where the control mode for controlling the driving current is switched from the second control mode to the first control mode, an initial value of the integral control in the first control mode is set based on the value of the driving current detected by the detector during the execution of the second control mode.

\* \* \* \* \*